United States Patent
Swaminathan et al.

(10) Patent No.: US 9,996,150 B2
(45) Date of Patent: Jun. 12, 2018

(54) ENABLING AUGMENTED REALITY USING EYE GAZE TRACKING

(71) Applicant: QUALCOMM Incorporated, San Diego, CA (US)

(72) Inventors: Ashwin Swaminathan, San Diego, CA (US); Mahesh Ramachandran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 326 days.

(21) Appl. No.: 13/838,467

(22) Filed: Mar. 15, 2013

(65) Prior Publication Data
US 2014/0168056 A1    Jun. 19, 2014

Related U.S. Application Data

(60) Provisional application No. 61/739,518, filed on Dec. 19, 2012.

(51) Int. Cl.
*G06T 7/00* (2017.01)
*G06T 11/00* (2006.01)
(Continued)

(52) U.S. Cl.
CPC ............ *G06F 3/013* (2013.01); *G06F 3/0481* (2013.01); *G06F 3/147* (2013.01);
(Continued)

(58) Field of Classification Search
CPC  G06K 9/00; G06K 9/40; G06Q 30/00; G09G 5/00; G09G 5/377; H04N 5/225;
(Continued)

(56) References Cited

U.S. PATENT DOCUMENTS

| 4,109,145 A | 8/1978 | Graf |
|---|---|---|
| 8,360,578 B2 | 1/2013 | Nummela |

(Continued)

FOREIGN PATENT DOCUMENTS

| CN | 102147658 A | 8/2011 |
|---|---|---|
| JP | 2005038008 A | 2/2005 |

(Continued)

OTHER PUBLICATIONS

Smith, M. Microsoft applies to patent gaze-tracking camera, wants to stare into your eyes, engadget, Jun. 15, 2012, 2 pages. (Retrieved from http://www.engadget.com/2012/06/15/microsoft-applies-to-patent-gaze-tracking-camera-wants-to-stare/).

(Continued)

*Primary Examiner* — Ilana Spar
*Assistant Examiner* — Nguyen H Truong
(74) *Attorney, Agent, or Firm* — Kilpatrick Townsend & Stockton/Qualcomm

(57) ABSTRACT

Methods and apparatus relating to enabling augmented reality applications using eye gaze tracking are disclosed. An exemplary method according to the disclosure includes displaying an image to a user of a scene viewable by the user, receiving information indicative of an eye gaze of the user, determining an area of interest within the image based on the eye gaze information, determining an image segment based on the area of interest, initiating an object recognition process on the image segment, and displaying results of the object recognition process.

22 Claims, 14 Drawing Sheets

(51) Int. Cl.
*G06F 3/01* (2006.01)
*G06F 3/147* (2006.01)
*G06K 9/00* (2006.01)
*G06K 9/22* (2006.01)
*G06F 3/0481* (2013.01)
*G06K 9/32* (2006.01)

(52) U.S. Cl.
CPC ..... *G06K 9/00604* (2013.01); *G06K 9/00671* (2013.01); *G06K 9/228* (2013.01); *G06K 9/3233* (2013.01); *G09G 2340/12* (2013.01)

(58) Field of Classification Search
CPC ........ H04N 5/228; H04N 13/00; H04N 13/02; H04L 29/06; G06F 21/00; G06F 15/16; G06F 3/00; G06F 3/01; G06F 3/033; G06F 3/048; G06F 17/00; G06T 15/00; G06T 15/20; G06T 13/00; G06T 7/00; H03G 3/00; G01C 21/00
See application file for complete search history.

(56) References Cited

U.S. PATENT DOCUMENTS

| | | | |
|---|---|---|---|
| 8,379,981 B1* | 2/2013 | Prokhorov | G06K 9/00765 382/173 |
| 2009/0092374 A1* | 4/2009 | Kulas | H04N 7/173 386/248 |
| 2010/0007601 A1* | 1/2010 | Lashina | G06F 3/013 345/156 |
| 2011/0111384 A1* | 5/2011 | Dietrich | G09B 7/00 434/350 |
| 2011/0273369 A1 | 11/2011 | Imai et al. | |
| 2011/0285622 A1 | 11/2011 | Marti et al. | |
| 2012/0154557 A1* | 6/2012 | Perez | H04N 21/25891 348/53 |
| 2012/0154619 A1 | 6/2012 | Lee | |
| 2012/0212508 A1 | 8/2012 | Kimball et al. | |
| 2012/0229909 A1 | 9/2012 | Clavin et al. | |
| 2012/0242842 A1* | 9/2012 | Yoshigahara | G06K 9/228 348/207.1 |
| 2012/0257035 A1 | 10/2012 | Larsen | |
| 2012/0290401 A1 | 11/2012 | Neven | |
| 2013/0050258 A1* | 2/2013 | Liu | G02B 27/017 345/633 |
| 2013/0050432 A1* | 2/2013 | Perez | H04N 13/0278 348/47 |
| 2013/0117377 A1* | 5/2013 | Miller | H04L 67/38 709/205 |
| 2013/0326364 A1* | 12/2013 | Latta | G06F 3/012 715/751 |
| 2014/0063055 A1* | 3/2014 | Osterhout | G06F 3/005 345/633 |
| 2014/0098132 A1* | 4/2014 | Fein | G06T 19/006 345/633 |

FOREIGN PATENT DOCUMENTS

| | | |
|---|---|---|
| JP | 2006155236 A | 6/2006 |
| JP | 2006155238 A | 6/2006 |
| JP | 2012008290 A | 1/2012 |

OTHER PUBLICATIONS

Toyama, et al., "Gaze Guided Object Recognition Using a Head-Mounted Eye Tracker," ETRA '12 Proceedings of the Symposium on Eye Tracking Research and Applications, 2012, pp. 91-98.

Written Opinion of the International Preliminary Examining Authority—PCT/US2013/074067—IPEA/EPO—dated Jan. 30, 2015, 6 pgs.

International Preliminary Report on Patentability—PCT/US2013/074067, European Patent Office—Netherlands, dated Oct. 4, 2015, 14 pgs.

International Search Report and Written Opinion—PCT/US2013/074067—ISA/EPO—dated Apr. 10, 2014.

\* cited by examiner

PRIOR ART

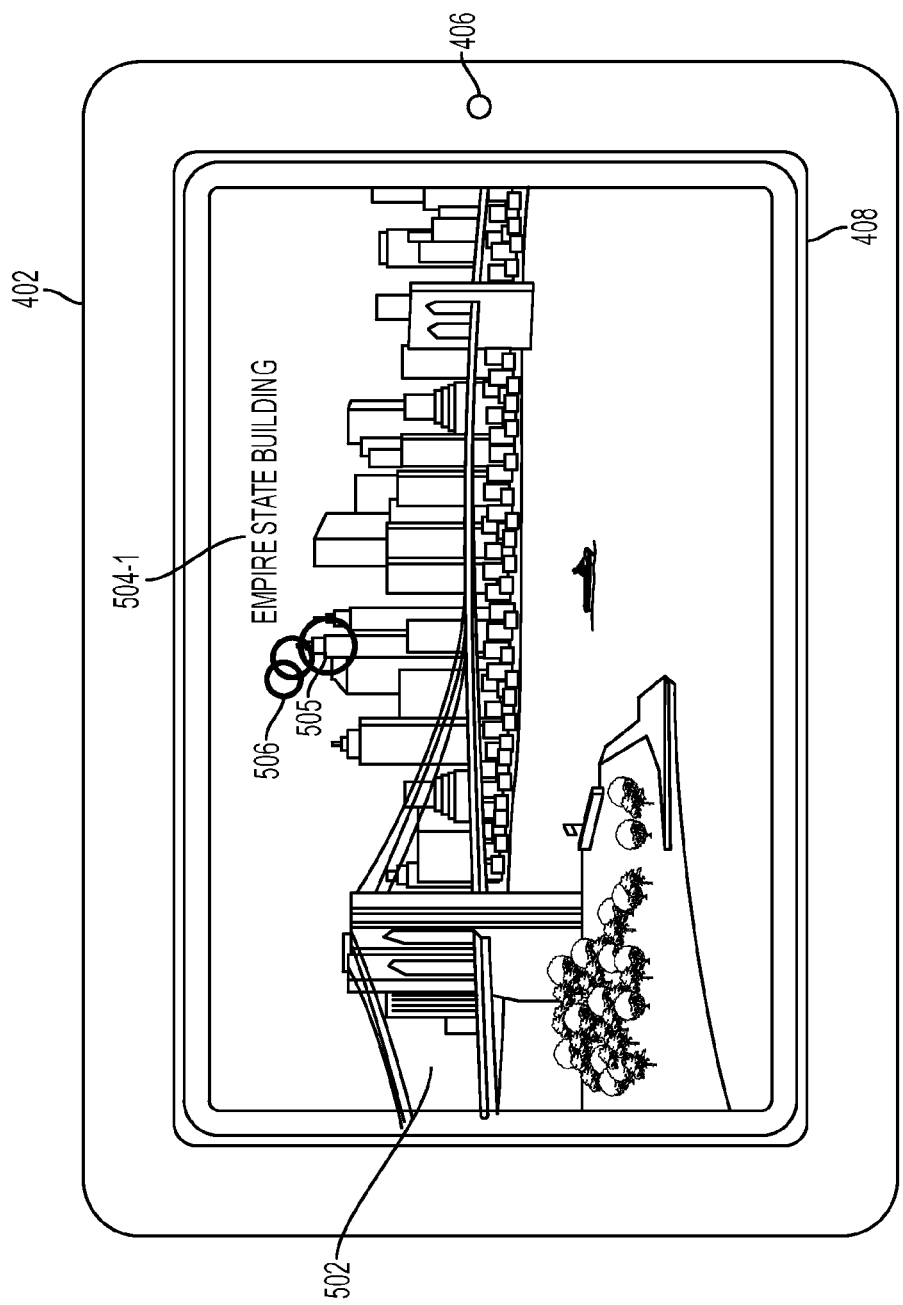

ENABLING AUGMENTED REALITY USING EYE GAZE TRACKING

CROSS-REFERENCE TO RELATED APPLICATIONS

This application claims the benefit of U.S. Provisional Application No. 61/739,518, filed on Dec. 19, 2012, which is assigned to the assignee hereof, and expressly incorporated herein by reference in its entirety.

FIELD

The subject matter disclosed herein relates to electronic devices with back facing cameras, and more particularly to methods, apparatuses, and systems for use with Augmented Reality (AR), for example in mobile electronic devices.

BACKGROUND

Mobile computing devices (mobile devices) provide users with access to a variety of information via wireless communication systems. As an example, mobile devices enabled for use with wireless cellular networks and/or wireless local area networks such as Wi-Fi or WiMAX provide users with access to vast information resources of the Internet. Mobile devices may also enable users to explore augmented reality environments which provide a real-time view of a target object merged with, or augmented by, computer generated graphical content. For example, cameras residing on-board a mobile device may be used in conjunction with a graphical display to present a user with supplemental information relating to targets of interest that are captured in a camera view of the mobile device. Such supplemental information may form an information layer that overlays real-world objects that are captured in a camera view of the mobile device. This functionality is generally referred to as Augmented Reality (AR) view mode. In an AR view, objects captured in the camera view can be transitioned to align with the display screen to allow a user easier access to the information layer.

A mobile device can have an AR mode view and AR target objects can be presented on a graphical display screen. In some situations, the number of AR target objects displayed to the user can be extensive. The AR target objects can create clutter on the view screen which can distract the user's view and can place a demand on the processing capabilities of the mobile device.

SUMMARY

An example of a method for enabling augmented reality applications using eye gaze tracking according to the disclosure includes displaying an image to a user of a scene viewable by the user, receiving information indicative of an eye gaze of the user, determining an area of interest within the image based on the eye gaze information, causing an object tag to be displayed in an image of the scene based on the location of the area of interest, and displaying augmented reality information if the area of interest lingers on or about the object tag.

Implementations of the method may include one or more of the following features. The image displayed to the user may be captured with a first camera coupled to a mobile device, and the eye gaze information may be determined based on an image captured with a second camera coupled to the mobile device. Hiding the object tag if the area of interest does not linger on or about the object tag. A back-facing camera or an eye gaze tracking tool may be used to receive the eye gaze information. The object tag may be an icon. A graphical representation of the area of interest may be displayed on the image. The graphical representation may be one or more circles, or other graphical icon. The image can be captured with a front facing camera.

An example of a method for enabling object recognition using eye gaze tracking according to the disclosure includes displaying an image to a user of a scene viewable by the user, receiving information indicative of an eye gaze of the user, determining an area of interest within the image based on the eye gaze information, determining an image segment based on the area of interest, initiating an object recognition process on the image segment, and displaying results of the object recognition process.

Implementations of the method may include one or more of the following features. Initiating may include performing the object recognition process. Initiating may include providing the image segment to a remote server and receiving an object recognition result from the remote server, such that the displaying may include displaying an augmented reality information based on the object recognition result. Receiving a pose information from the remote server, and displaying the augmented reality information based on the pose information. The image may be captured with a first camera coupled to a mobile device, and the eye gaze information may be determined based on an image captured with a second camera coupled to the mobile device. The results of the object recognition process may include displaying an augmented reality information. Displaying the augmented reality information if the area of interest lingers on or about the image segment. Displaying the results of the object recognition process may include displaying an object tag. Displaying augmented reality information if the area of interest lingers on or about the object tag. Displaying an image segment boundary line.

An example of a method for using eye gaze tracking to display location based augmented reality information according to the disclosure includes displaying an image on a mobile device, determining a location based augmented reality object based on a location of the mobile device, displaying an icon in the image, wherein a position of the icon within the image is based on location information associated with the location based augmented reality object or a location of a real-world object visible in the image, determining an area of interest within the image based on a user's eye gaze, and displaying, on the mobile device, augmented reality information associated with the location based augmented reality object or the real-world object if the area of interest overlaps with the position of the icon.

Implementations of the method may include one or more of the following features. The image may be obtained with a front-facing camera on the mobile device. A back-facing camera on the mobile device may be used to determine the user's eye gaze. The image can be a file displayed in an application. A graphical representation of the area of interest may be displayed.

An example of a method according to the disclosure includes displaying on a mobile device a first image captured by a first camera of the mobile device, determining a gaze of a user of the mobile device based on a second image captured by a second camera of the mobile device, determining an area of interest within the first image based on the determined gaze, and performing, at the mobile device, one or more actions associated with an augmented reality function based at least in part on the determined area of interest.

Implementations of the method may include one or more of the following features. The one or more actions may include displaying augmentation information associated with an object in the first image that is substantially within the area of interest. The one or more actions may include tracking an object in the first image that is substantially within the area of interest. The one or more actions may include object recognition performed with respect to an object in the first image that is substantially within the area of interest. The augmented reality function may be further based on a location of the mobile device.

An example of a method for enabling object tracking using image segmentation according to the disclosure includes displaying a first image to a user of a scene viewable by the user from a first camera orientation, receiving information indicative of an eye gaze of the user, determining an area of interest within the first image based on the eye gaze information, determining an image segment based on the area of interest, performing an object tracking process on the image segment to determine a first pose of the image segment, and displaying an augmented reality object in a first AR pose based on the first pose of the image segment.

Implementations of the method may include one or more of the following features. Displaying a second image to the user of the scene viewable by the user from a second camera orientation, such that the second image includes the image segment, performing the object tracking process on the image segment to determine a second pose of the image segment, and displaying the augmented reality object in a second augmented reality pose based on the second pose of the image segment. Performing the object tracking process may include providing the image segment to a remote server.

An example of a method for enabling object recognition using eye gaze tracking according to the disclosure includes displaying an image to a user of a scene viewable by the user, receiving information indicative of an eye gaze of the user, determining an area of interest within the image based on the eye gaze information, determining an image segment based on the area of interest, providing the image segment to a remote server, receiving an object recognition result from the remote server, and displaying an augmented reality information based on the object recognition result. In an implementation, the method may receive a pose information from the remote server, and display the augmented reality information based on the pose information.

An example of an apparatus for enabling object recognition using eye gaze tracking according to the disclosure includes a memory, at least one processor coupled to the memory and configured to display an image to a user of a scene viewable by the user, receive information indicative of an eye gaze of the user, determine an area of interest within the image based on the eye gaze information, determine an image segment based on the area of interest, initiate an object recognition process on the image segment, and display results of the object recognition process.

An example of an apparatus for using eye gaze tracking to display location based augmented reality information according to the disclosure includes a memory, at least one processor coupled to the memory and configured to display an image on a mobile device, determine a location based augmented reality object based on a location of the mobile device, display an icon in the image, wherein a position of the icon within the image is based on location information associated with the location based augmented reality object or a location of a real-world object visible in the image, determine an area of interest within the image based on a user's eye gaze, and display, on the mobile device, augmented reality information associated with the location based augmented reality object or the real-world object if the area of interest overlaps with the position of the icon.

An example of an apparatus for enabling object recognition using eye gaze tracking according to the disclosure includes means for displaying an image to a user of a scene viewable by the user, means for receiving information indicative of an eye gaze of the user, means for determining an area of interest within the image based on the eye gaze information, means for determining an image segment based on the area of interest, means for initiating an object recognition process on the image segment, and means for displaying results of the object recognition process.

An example of apparatus for using eye gaze tracking to display location based augmented reality information based on the disclosure includes means for displaying an image on a mobile device, means for determining a location based augmented reality object based on a location of the mobile device, means for displaying an icon in the image, wherein a position of the icon within the image is based on location information associated with the location based augmented reality object or a location of a real-world object visible in the image, means for determining an area of interest within the image based on a user's eye gaze, and means for displaying, on the mobile device, augmented reality information associated with the location based augmented reality object or the real-world object if the area of interest overlaps with the position of the icon.

An example of a non-transitory computer storage medium according to the disclosure includes processor-executable instructions configured to cause a processor to display an image to a user of a scene viewable by the user, receive information indicative of an eye gaze of the user, determine an area of interest within the image based on the eye gaze information, determine an image segment based on the area of interest, initiate an object recognition process on the image segment, and display results of the object recognition process.

An example of non-transitory computer storage medium according to the disclosure includes processor-executable instructions configured to cause a processor to display an image on a mobile device, determine a location based augmented reality object based on a location of the mobile device, display an icon in the image, wherein a position of the icon within the image is based on location information associated with the location based augmented reality object or a location of a real-world object visible in the image, determine an area of interest within the image based on a user's eye gaze, and display, on the mobile device, augmented reality information associated with the location based augmented reality object or the real-world object if the area of interest overlaps with the position of the icon.

Items and/or techniques described herein may provide one or more of the following capabilities, as well as other capabilities not mentioned. Images of a scene can be captured by a front-facing camera of a mobile device, and the eye gaze of the user may be tracked by a back-facing camera on the mobile device. An area of interest may be determined based on the location of the user's eye gaze. An image segmentation process may be initiated based on the location of the area of interest. Object recognition may be performed on an image segment. Augmented reality information may be presented based on the location and linger time of the area of interest. Object tags may be displayed. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

BRIEF DESCRIPTION OF DRAWINGS

Non-limiting and non-exhaustive aspects are described with reference to the following figures, wherein like reference numerals refer to like parts throughout the various figures unless otherwise specified.

FIG. 6A is an exemplary illustration of an image with an AR object tag displayed as a function of the location of the user's gaze.

DETAILED DESCRIPTION

Figure 1:
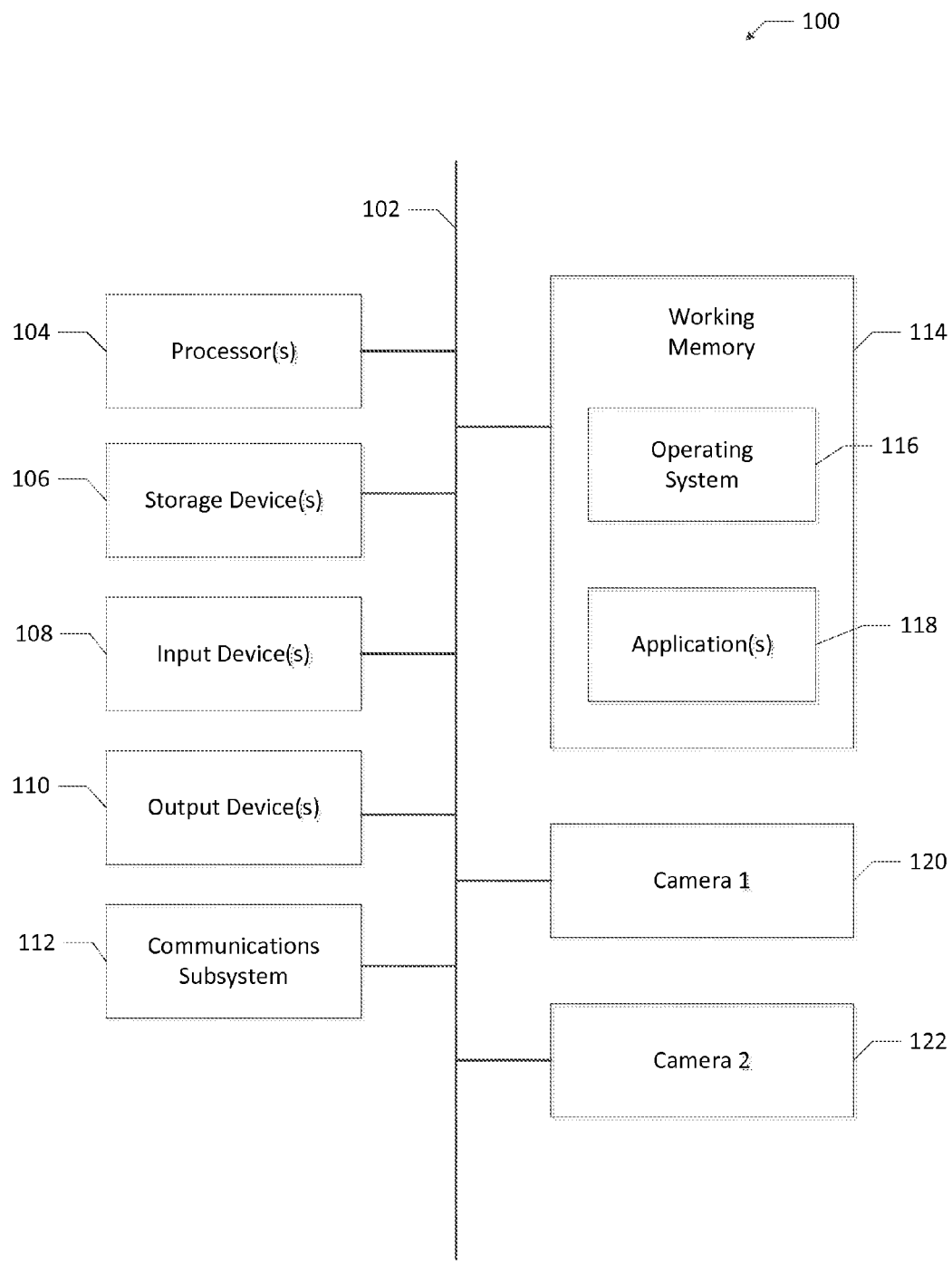
FIG. 1 illustrates an exemplary computer system incorporating parts of the device employed in practicing embodiments of the invention.

In recent times, many mobile devices have multiple cameras—a front facing camera, back-facing camera, etc. and many more cameras may be included in mobile devices going into the future. In most augmented reality applications, while the front facing camera is looking at the image target, a back-facing camera may point to the user who is operating the mobile device. For example, the back-facing camera can capture images of the user's eyes, which can be used to determine a location on the display screen that is the current object under the user's gaze. This functionality is generally referred to as eye gaze tracking. Eye gaze tracking can be used to evaluate a user's interest in an image on the display screen.

Implementations relating to enabling augmented reality applications using eye gaze tracking are disclosed in a mobile computing context. Target objects such as buildings, road signs, magazine advertisements, billboards, documents, and other real-world 2D and 3D objects can be captured with a front-facing camera in an AR view mode of a mobile device. A user's eye gaze can be determined with information captured by a rear-camera on the mobile device. Augmented reality information may be determined, for example, by application of active segmentation and object recognition techniques to obtain electronic representations of the target areas and/or objects. The object recognition pipeline can be based on an area of interest defined by the user's eye gaze. The area of interest can be determined by active segmentation algorithms. Such segments may comprise multiple (key) points with their associated descriptors obtained from the AR view of target objects within the area of interest. Image segments may be based on image aspects such as color, texture, boundaries and intensity. The coarseness of the segmentation may depend on the application or processing capabilities of a mobile device, or remote server. A user may select a segmentation algorithm to improve the operational performance based on available processing abilities, or power requirements. Information layers supporting augmented reality environments may be defined by a mobile device user through application of one or more presentation regions and/or activation regions that may be attached to such electronic representations of extracted target objects.

A presentation region for a media content item may be deployed to an augmented reality environment by a user for the purpose of defining a location (e.g., a position and/or orientation) where the media content item is presented within that augmented reality environment. An activation region for a media content item may be deployed within an augmented reality environment by a user for the purpose of defining conditions for how and/or when the presentation of the media content item at an associated presentation region may be enabled and/or initiated responsive to user eye gaze location and/or estimated mobile device position and/or orientation. An activation region can be within a user's eye gaze to initiate a transition from the augmented reality environment to a non-augmented reality view (i.e., an application). The transition can include stages based on the time the user's eye gaze lingers on the activation region.

FIG. 1 illustrates an exemplary computer system incorporating parts of the device employed in practicing embodiments of the invention. A computer system as illustrated in FIG. 1 may be incorporated as part of the computerized devices described below. For example, computer system 100 can represent some of the components of a mobile device or a smart phone. A mobile device may be any computing device with an input sensory unit like a camera and may also include a display unit. Examples of a mobile device include but are not limited to video game consoles, tablets, smart phones and any other hand-held devices. FIG. 1 provides a schematic illustration of one embodiment of a computer system 100 that can perform the methods provided by various other embodiments, as described herein, and/or can function as the host computer system, a remote kiosk/terminal, a point-of-sale device, a mobile device, a set-top box and/or a computer system. FIG. 1 is meant only to provide a generalized illustration of various components, any or all of which may be utilized as appropriate. FIG. 1, therefore, broadly illustrates how individual system elements may be implemented in a relatively separated or relatively more integrated manner.

Figure 2:
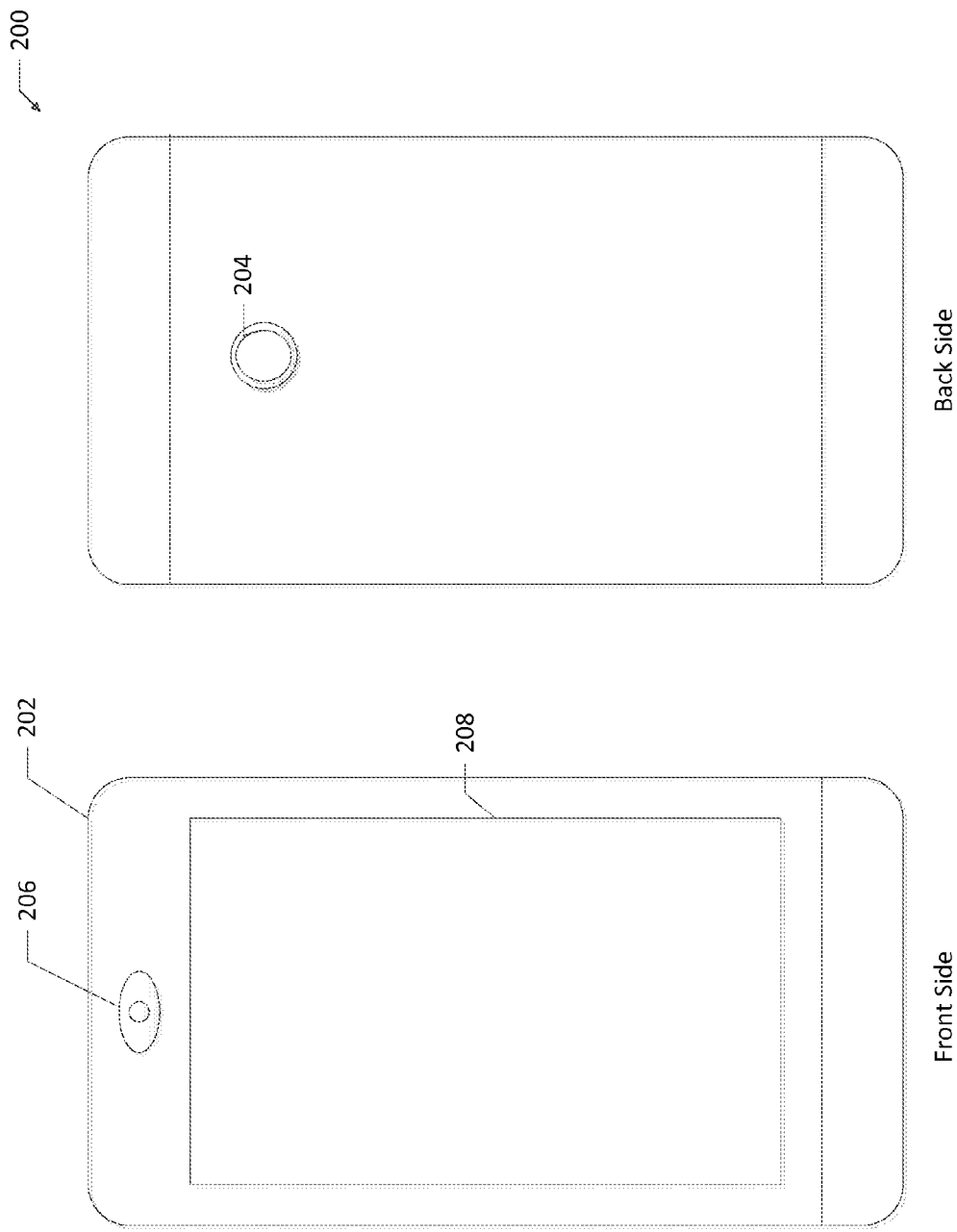
FIG. 2 is an exemplary figure of a device performing embodiments of the invention.

The computer system 100 is shown comprising hardware elements that can be electrically coupled via a bus 102 (or may otherwise be in communication, as appropriate). The hardware elements may include one or more processors 104, including without limitation one or more general-purpose processors and/or one or more special-purpose processors (such as digital signal processing chips, graphics acceleration processors, and/or the like); one or more input devices 108, which can include without limitation one or more cameras, sensors (including inertial sensors), a mouse, a keyboard and/or the like; and one or more output devices 110, which can include without limitation a display unit such as the device display of FIGS. 4-10. In addition to the input device(s) 108, the front-facing camera 204 and the back-facing camera 206 as depicted in FIG. 2, may be implemented as a first camera 120 and a second camera 122, respectively. Furthermore, in some embodiments an input and output device may be integrated, for example in a touch screen or capacitive display.

The computer system 100 may further include (and/or be in communication with) one or more non-transitory storage devices 106, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like. Device storage may be used in a number of embodiments discussed herein.

The computer system 100 might also include a communications subsystem 112, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 112 may permit data to be exchanged with a network (such as the network described below, to name one example), other computer systems, and/or any other devices described herein. In many embodiments, the computer system 100 will further comprise a non-transitory working memory 114, which can include a RAM or ROM device, as described above.

The computer system 100 also can comprise software elements, shown as being currently located within the working memory 114, including an operating system 116, device drivers, executable libraries, and/or other code, such as one or more application programs 118, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 106 described above. In some cases, the storage medium might be incorporated within a computer system, such as computer system 100. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 100) to perform methods in accordance with the disclosure. For example, some or all of the procedures of the described methods may be performed by the computer system 100 in response to processor 104 executing one or more sequences of one or more instructions (which might be incorporated into the operating system 116 and/or other code, such as an application program 118) contained in the working memory 114. Such instructions may be read into the working memory 114 from another computer-readable medium, such as one or more of the storage device(s) 106. Merely by way of example, execution of the sequences of instructions contained in the working memory 114 might cause the processor(s) 104 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 100, various computer-readable media might be involved in providing instructions/code to processor(s) 104 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 106. Volatile media include, without limitation, dynamic memory, such as the working memory 114. Transmission media include, without limitation, coaxial cables, copper wire and fiber optics, including the wires that comprise the bus 102, as well as the various components of the communications subsystem 112 (and/or the media by which the communications subsystem 112 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 104 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 112 (and/or components thereof) generally will receive the signals, and the bus 102 then might carry the signals (and/or the data, instructions, etc. carried by the signals) to the working memory 114, from which the processor(s) 104 retrieves and executes the instructions. The instructions received by the working memory 114 may optionally be stored on a non-transitory storage device 106 either before or after execution by the processor(s) 104.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

FIG. 2 is an exemplary figure of a device 200 performing embodiments of the invention. In one embodiment, FIG. 2 may represent a mobile station using one or more components of the device described with reference to FIG. 1. However, embodiments of the invention are not limited to using smart phones or tablets, and may use any device with capabilities similar to FIG. 1 and suitable for performing embodiments of the invention. Such devices may include mobile devices, digital cameras, camcorders, tablets, PDAs or any other similar device. FIG. 2 represents a front side and back side of a smart phone. The phone includes a display 208 and a first camera 206. The display 208 may be an output device 110, as discussed with reference to FIG. 1. The first camera coupled to the front side of the smart phone and directed back to the user may be referred to as back-facing camera. The rear side of the smart phone includes a second camera 204. The second camera coupled to the rear side of the smart phone and directed away from the user may be referred to as the front-facing camera. The back-facing camera may face the user of the device and the front-facing camera may face away from the user of the device. Both the front-facing camera and the back-facing camera may be an implementation of an input device 108 or may be implemented as a first camera 120 and a second camera 122, as discussed with reference to FIG. 1. The device 200 in FIG. 2 is exemplary only, and not a limitation. Other devices with multiple cameras and different orientations may be used. For example, the device 200 may be a Head Mounted Display (HMD) and may have a different form factor. The device 200 may be a photographic equipment (e.g., digital camera or video recorder) that includes a display and multiple optical paths. Other devices may also be used. In some embodiments, a the first camera 120 and the second camera 122 are disposed so as to be angled with respect to one another, for example when a camera is integrated into an edge of a mobile device as well as there being a camera on the back and/or front of the mobile device.

Figure 3:
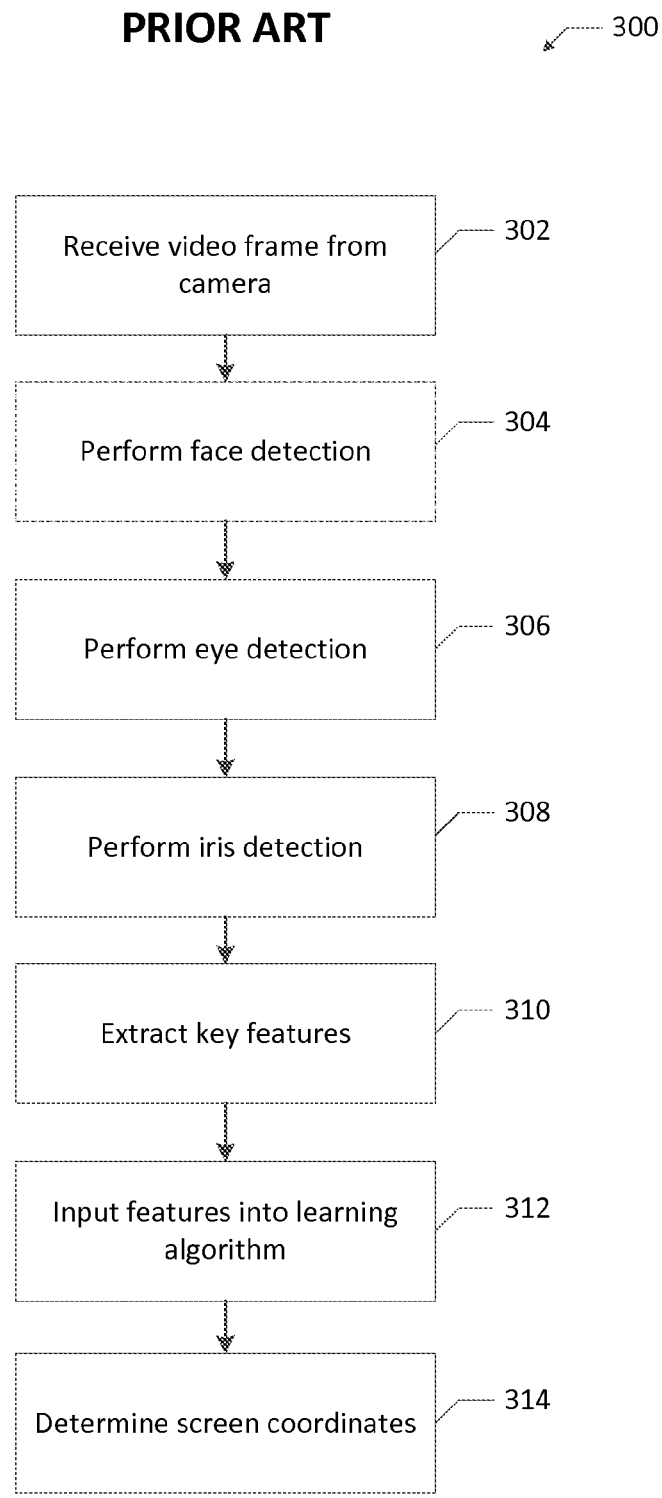
FIG. 3 is an exemplary prior art process flow for performing eye gaze tracing with a back-facing camera on a mobile device.

Referring to FIG. 3, an exemplary prior art process flow 300 for performing eye gaze tracing with a back-facing camera on a mobile device is shown. The process 300, however, is exemplary only and not limiting. The process 300 may be altered, e.g., by having stages added, removed, or rearranged. Other process for receiving eye gaze tracking information may be used. At stage 302, the mobile device 200 can utilize the back-facing camera 206 to provide a video frame to one or more processors 104. The process can include an optional step 304 of utilizing a face detection algorithm to identify the face of the user to pass the coordinates of the eyes to an eye detection algorithm 306. The eye gaze tracking information can be based on the relative position of a user's iris. For example, the eye detection algorithm can pass the coordinates of the eyes to an iris detection algorithm at stage 308. The coordinates of the iris can be passed to a pre-processing algorithm to extract key features from the eye at stage 310. For example, the size and point of the iris can be mapped and a segment of fixed size can be selected. The brightness of each pixel within the segment can be used and input value to a learning algorithm at stage 312. By means of an example, a neural network may be used for the learning algorithm. In an example, the neural network is a basic two-layer network with a symmetric sigmoid activation function. Additional layers can be used to increase the accuracy of the neural network. Two output neurons can be used for the (x,y) screen coordinates at stage 314. The screen coordinates can be the basis for an area of interest which can be used by an application running on the device 100.

Figure 4:
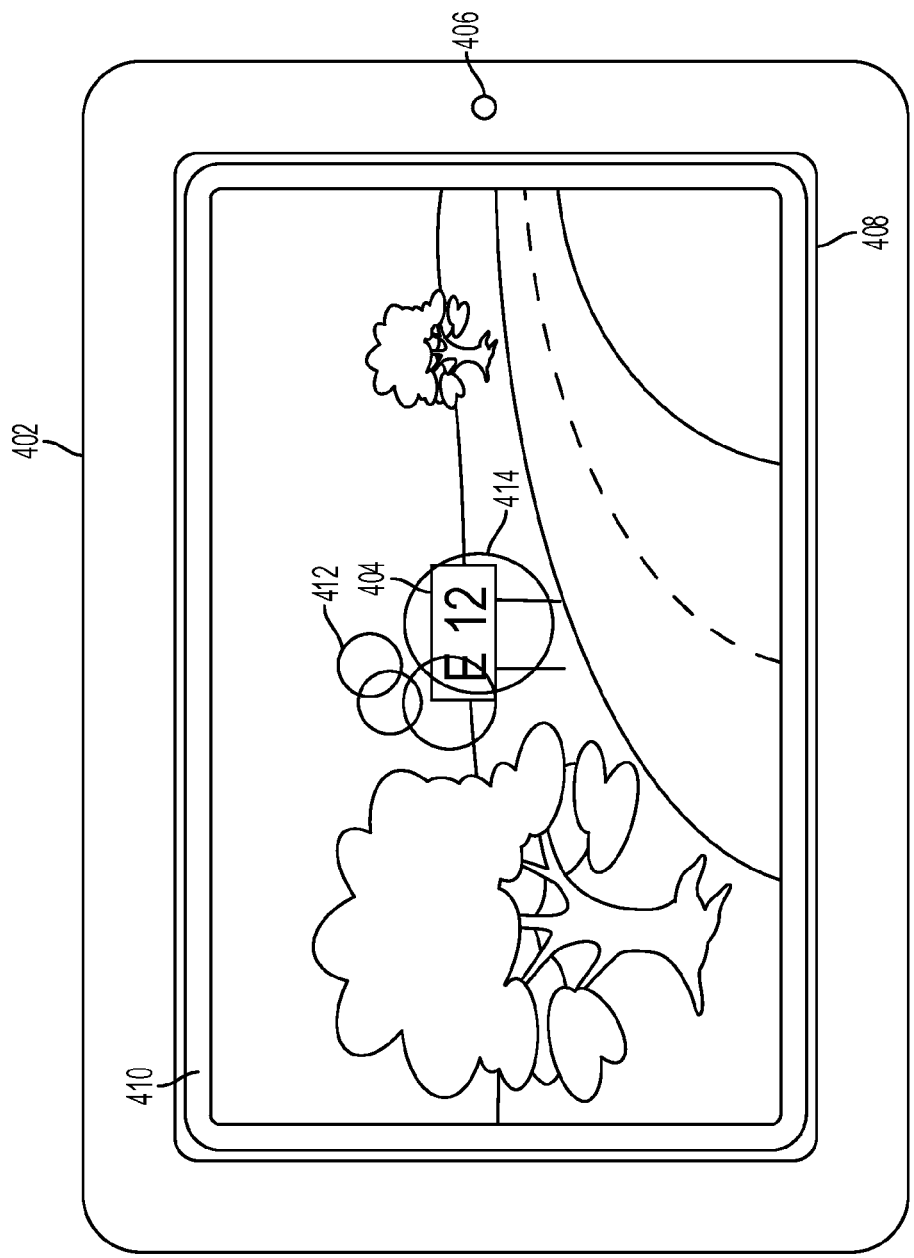
FIG. 4 is an exemplary illustration of using eye gaze tracking to identify an area of interest on an image captured with a front-facing camera on a mobile device.

Referring to FIG. 4, with further reference to FIGS. 1 and 2, an exemplary illustration of using eye gaze tracking to identify an area of interest on an image captured with a front-facing camera on a device 402 is shown. In an embodiment, the device 402 is a mobile device 100. The device 402 includes a front-facing camera (not shown), a back-facing camera 406, and a display 408. The image in the display 408 includes a road sign 404, a background light enhancing region 410, a graphical representation of an area of interest 412, and an area of interest 414. In operation, a user can direct the front-facing camera toward a real time scene such as a road sign 404. The image can be presented on the display 408 in a camera view or an AR view mode. The image can also be stored in memory 106. The back-facing camera 406 may be used to determine an area of interest 414 based on an eye gaze tracking algorithm (e.g., FIG. 3). In an embodiment, the display 408 can activate a background light enhancing region 410 to help illuminate the user's eyes. For example, a region of the display 408 can be set to a bright white color to provide more light towards the user's face and eyes. In an embodiment, the region 410 can form a frame around the image. Other shapes and patterns such as circles or bright dots, or different shapes in the corners of the display 408 may be used. The shape of the enhancing region 410 can be used to help the camera 406 detect a key feature at stage 310 in an eye gazing process 300.

In an embodiment, the area of interest 414 can be represented on the display 408 by a graphical representation such as one or more circles 412 to provide feedback to the user. The diameter of the circles 412 can be a function of the amount of time the user's gaze lingers in an area (e.g., the more time, the larger the diameter). Multiple circles can be used to create a tracking effect as the user's gaze moves across the display 408. The circles are exemplary only and not a limitation as other shapes or indications may be used.

The location of the area of interest 414 may be used as a seed location for an image segmentation algorithm. For example, the segmentation algorithm can determine a boundary of a target object (e.g., the sign 404), and the subsequent image processing can be limited to the area defined by the segment. The use of segmentation may reduce the processing power required for image recognition. As a result, when the area of interest 414 lingers in an area that contains an AR target object (e.g., the road sign 404), the device 402 can be configured to determine an image segment, perform image recognition on the segment, and present any AR information that is associated with the image recognition. In an example, the AR information can be an AR object tag which represents additional data displayed over the image. In an embodiment, if the area of interest 414 lingers over the area of the display 408 containing the AR object tag, the device 402 may be configured to present additional AR information or execute another application (e.g., a road map or navigation application). The AR information can fade from the display if the area of interest moves to another location.

Figure 5:
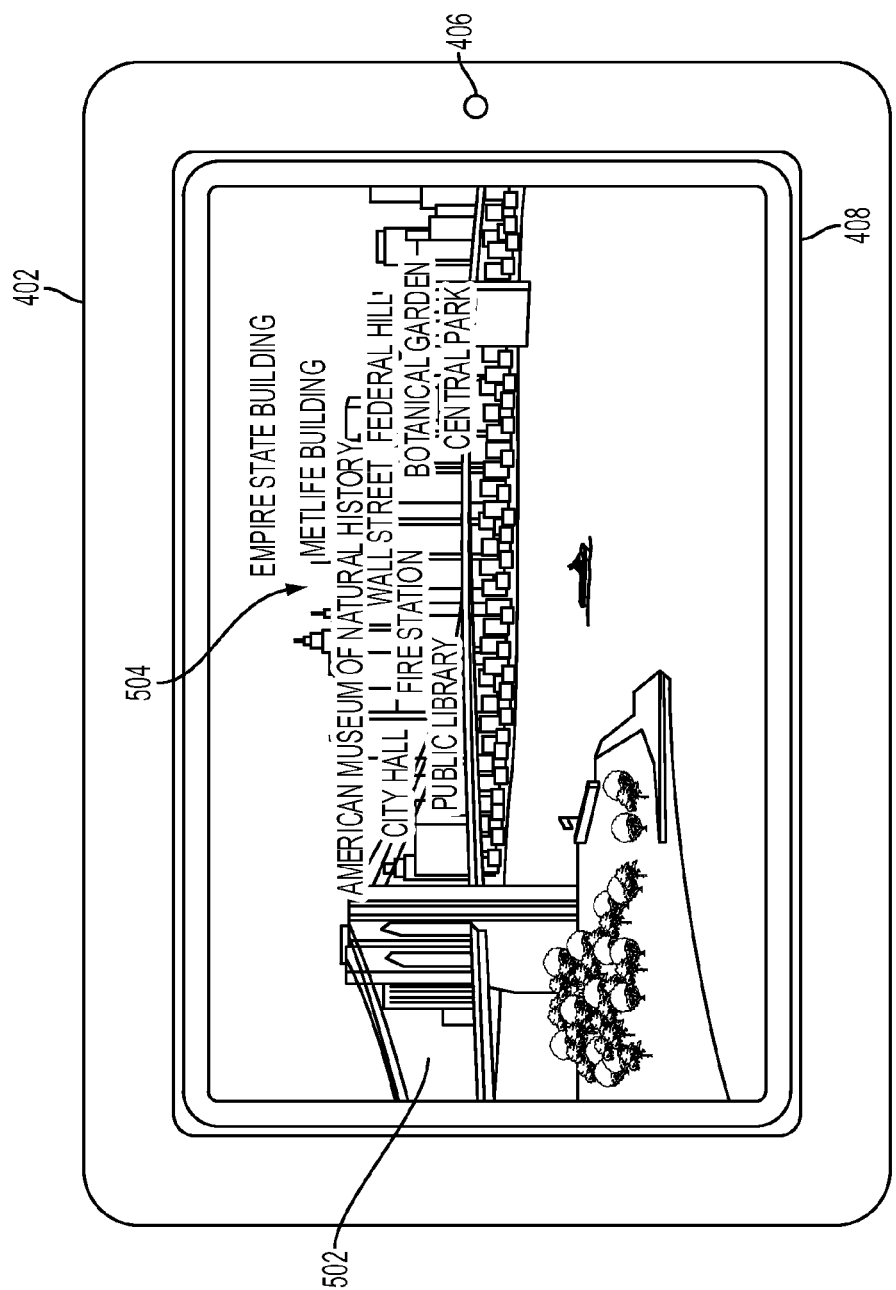
FIG. 5 is an exemplary illustration of an image cluttered with AR object tags.

Referring to FIG. 5, with further reference to FIG. 4, an exemplary illustration of an image 502 cluttered with a collection of AR object tags 504 is shown. In this example, the device 402 is a mobile device 100. The device 402 includes a front-facing camera (not shown), a back-facing camera 406, and a display 408. The image in the display 408 includes an image 502 and several object tags 504. The image 502 can be based on input from the front-facing camera (not shown), or an image file retrieved from memory. Each of the individual object tags provide an indication to the user that AR information is associated with at least a portion of the image 502. The object tags 504 can be location based information which is retrieved from a server based on the geographical location of the device 402. In an embodiment, the object tags 504 can be the result of an image segmentation and recognition process, or associated with an image file (e.g., metadata). The example presented in FIG. 5 does not depend on receiving the user's eye gaze tracking information. As a result of not knowing the area of the image that the user is interested in, the device 402 may display all of the object tags 504 simultaneously. Thus, the image 502 is cluttered with the collection of AR object tags 504 which may obscure the user's view of the content of the image.

Referring to FIG. 6A, with further reference to FIG. 5, an exemplary illustration of the image 502 with an AR object tag 504-1 displayed as a function of the location of the user's gaze is shown. FIG. 6A continues the example of FIG. 5 with the incorporation of the user's eye gaze information. The display 408 includes the image 502, a single object tag 504-1, an image segment including the Empire State Building 505, and an area of interest 506 determined by processing the user's eye gaze. In contrast to the several object tags 504 shown in FIG. 5, the single object tag 504-1 is shown based on its proximity to the area of interest 506. The device 402 may be configured to utilize the back-facing camera 406 and an eye gaze tracking algorithm (i.e., stored in memory 114) to identify the area of interest 506 based on the location of the user's gaze. The several object tags 504 may remain hidden until the area of interest 506 passes over or near a position that is associated with an AR target object. In this example, as depicted in FIG. 6A, the "Empire State Building" text is an object tag and can appear as the user's gaze passes over or near a segment of the image containing the Empire State Building. The image segment may be highlighted with a boundary line or other graphical enhancement (e.g., brightened, color change, raised) to indicate that augmented reality information is available. In the FIG. 6A, however, such highlighting is not illustrated, nor is a segment line surrounding the Empire State Building. In an embodiment, the location of the object tag maintains a position that is on or near the associated image segment such that the object tag will move if the image moves (e.g., when the orientation of the camera changes). The distance between the area of interest 506 and the object tag 504-1 may be based on a Cartesian coordinate system (e.g., pixels on the display 408). An image segmentation and recognition process may be used to recognize an AR target object and then make the association to one or more object tags. In an embodiment, the object tag 504-1 may indicate that additional augmented reality information is available. In the example of FIG. 6A, if the user prolongs their gaze (i.e., lingers) on the segment of the image containing the Empire State Building, or the "Empire State Building" text (i.e., the object tag), additional augmented reality information may be presented to the user. As previously described, the augmented reality information can be, but is not limited to, additional information which appears on the screen, such as media files, hyperlinks, GUI objects, interactive icons, executing one or more applications, or other Augmented Reality feature as known in the art.

Figure 6B:
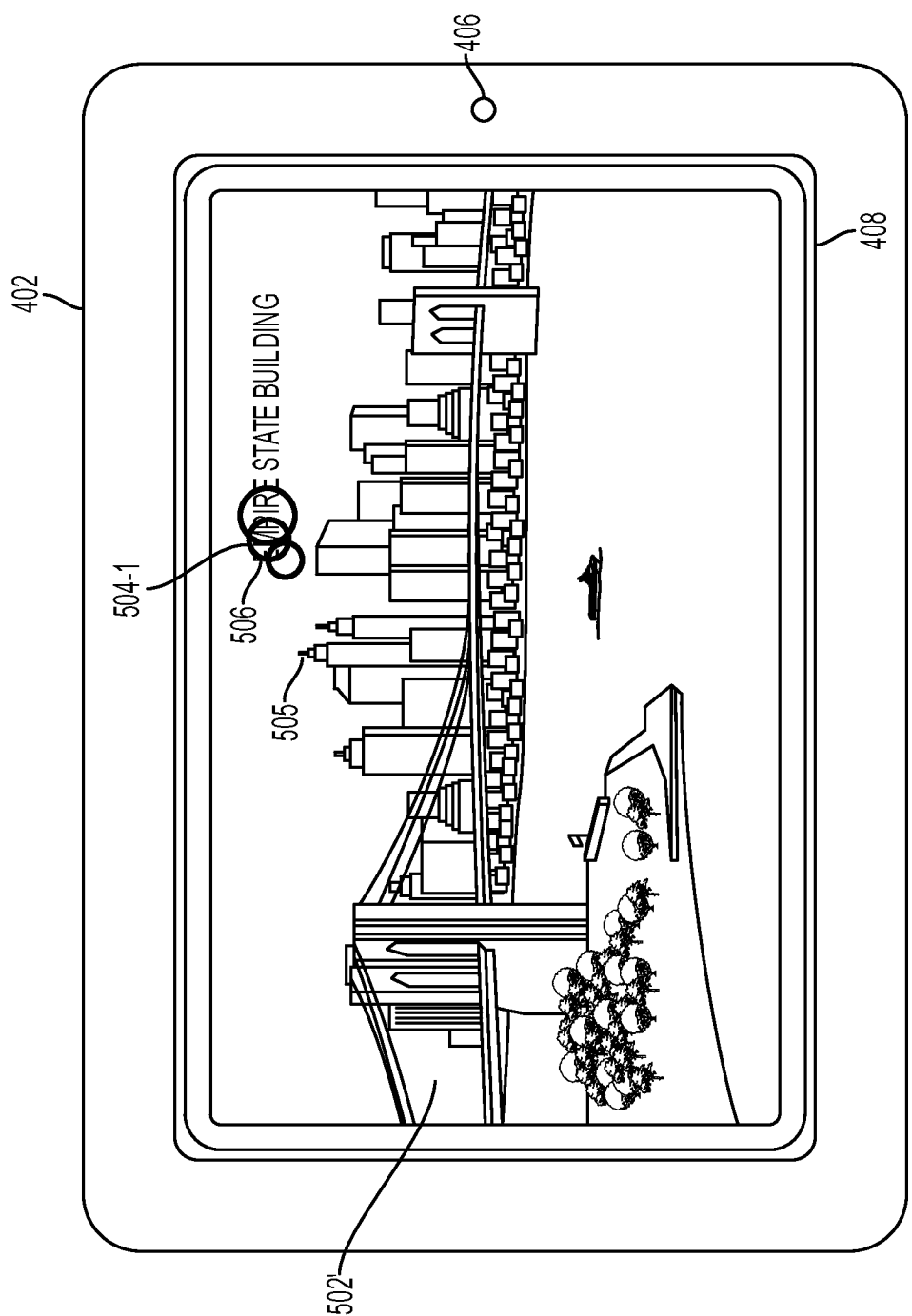
FIG. 6B is an exemplary illustration of an image with the user's gaze located on an AR object tag.

Referring to FIG. 6B, with further reference to FIG. 6A, an exemplary illustration of an image 502' with the user's gaze located on an AR object tag 504-1 is shown. The display 408 contains a moving real time image 502', the area of interest 506, and the object tag 504-1. In a real time image mode (i.e., camera mode), a user may struggle to hold the device 402 steady. As a result of moving the device 402, an image on the display 408 may also shift position. In the example depicted in FIG. 6B, the user moved the device 402 which caused the image 502 to shift and become 502'. The moving image 502' may present difficulties to the user and the image processing algorithms in the recognition of a target object, and in determining if the user's gaze is lingering on the target object. In an embodiment, after an initial recognition of the image segment containing the Empire State Building 505, the object tag 504-1 can be displayed. The location of the object tag 504-1 can be fixed in a position that remains constant relative to the display 408. As a result, the object tag 504-1 will appear to remain fixed in a position on the display 408 even if the image 502' moves (i.e., when the user changes the orientation of the forward facing camera). The user can then linger the area of interest 506 over the object tag 504-1 to access additional augmented reality information. The duration in which the object tag 504-1 will remain can be based on preset time periods (e.g., 1, 2, 5, seconds), or on a dynamic event such as detecting another target object, or determining that the user is not looking at the display 408. The ability to place the object tag 504-1 in a fixed position on the display 408 for a duration of time may improve the efficiency of the eye gaze tracking algorithm in that continuous adjustments for a drifting gaze (e.g., due to the relative movement of the target object in the display 408) can be reduced.

Figure 7:
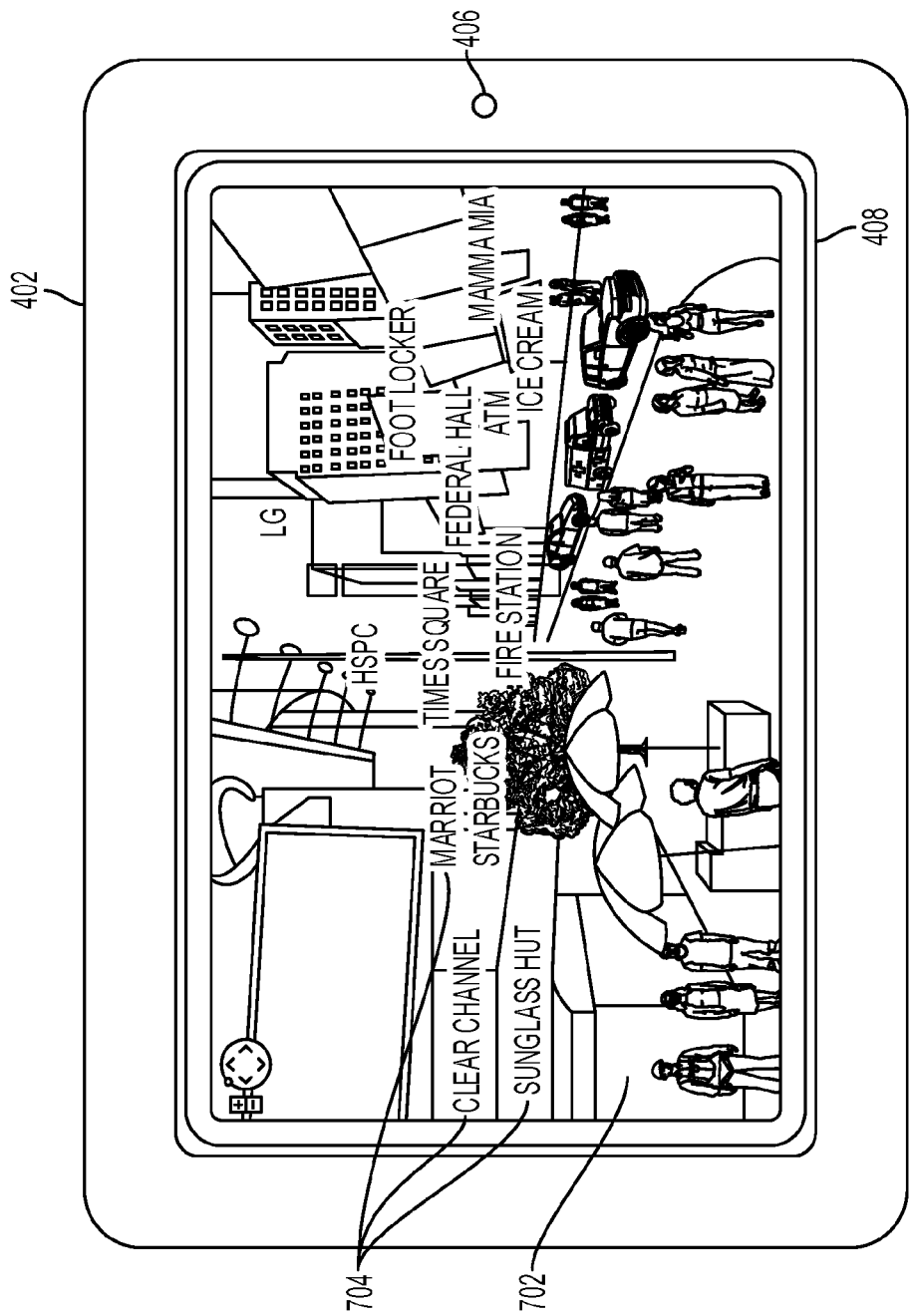
FIG. 7 is an exemplary illustration of an image with location based augmentation information cluttered across the display.

Referring to FIG. 7, with further reference to FIG. 4, an exemplary illustration of an image 702 with location based augmentation information cluttered across the display is shown. The display 408 shows an image 702 with several object tags 704. In an embodiment, the device 402 may contain a Satellite Positioning System (SPS) receiver capable of receiving Satellite Positioning System (SPS) signals via a SPS antenna. A SPS receiver may also process, in whole or in part, the Satellite Positioning System (SPS) signals and use the SPS signals to determine the location of the device 400. In some embodiments, the processor(s) 104, memory 114, DSP(s) and specialized processors (not shown) may also be utilized to process the SPS signals, in whole or in part, and/or calculate the location of the device 402, in conjunction with SPS receiver. Existing applications such as Google StreetView and Yelp Monocle can utilize the location information to display object tags based on the location and orientation of the device 402. For example, as depicted in FIG. 7, when a user points the front-facing camera of the device 402 at a street view, the system can utilize the location and heading information to search a database and present several object tags 704 on the display 408. The object tags 704 can appear in the approximate position of the corresponding business or attraction. As the implementation of such applications grows, such street views may become cluttered with the potential object tags, as depicted in FIG. 7.

Figure 8:
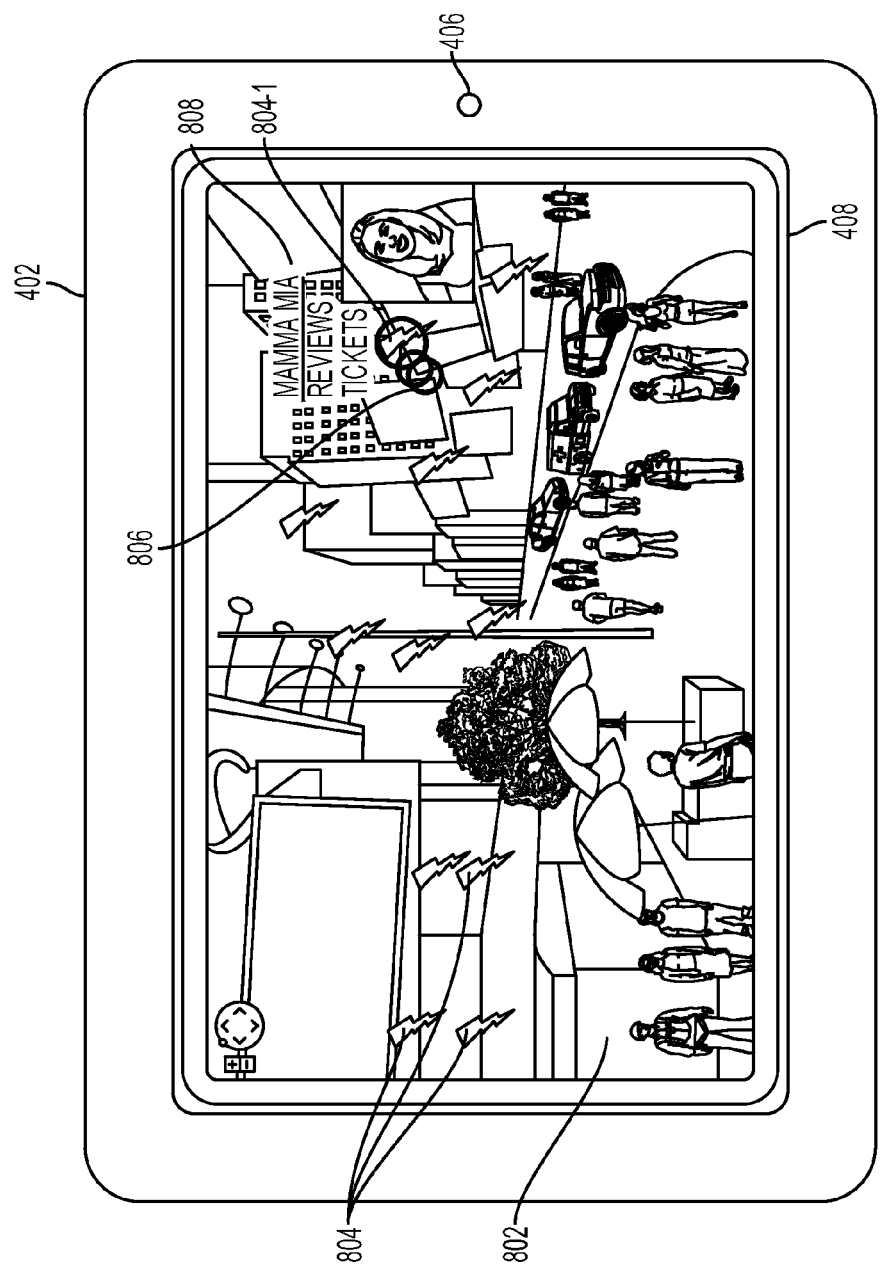
FIG. 8 is an exemplary illustration of an image with icons indicating where location based augmentation information is available.

Referring to FIG. 8, with further reference to FIG. 7, an exemplary illustration of an image 802 with icons 804 indicating where location based augmentation information is available. The display 408 shows an image 802 with several object tag icons 804, a particular icon 804-1, an area of interest 806, and a second object tag 808. In an embodiment, the text tags 704 depicted in FIG. 7 can be replaced with object tag icons 804 to help reduce the clutter in the image 802. For example, as depicted in FIG. 8, the object tag icons 804 are lightning bolts and are located in the proximate locations of businesses or attractions which are associated with augmented reality information. The object tag icons 804 are exemplary only, and not a limitation, as a variety of different shapes, objects and sizes may be used to help reduce the clutter on the image 802.

In addition to displaying the object tag icons 804, the device 402 can utilize the back-facing camera 406 to perform eye gaze tracking and determine an area of interest 806 based on the user's gaze. In this example, as the user gazes on or near a particular object tag icon 804-1, a second object tag 808 may appear. In the example in FIG. 8, the user lingers over the object tag icon 804-1 that is associated with a theater and the Broadway play "Momma Mia." When the area of interest 806 lingers on the object tag icon 804-1, the second object tag 808 may be displayed to present the user with additional information or choices. In an embodiment, the second object tag 808 does not need to be geo-referenced to the image 802 and can remain in the same screen position regardless of the orientation of the front facing camera. The user can then linger their gaze on portions of second object tag 808 to access additional augmented reality information. For example, the user can linger on the "Reviews" text of the second object tag 808 and the device 402 can respond with a pop-up window with current reviews of the play. The user may also linger their gaze on the "Tickets" text of the second object tag 808 and the device 402 can transition to a ticket ordering application. The text fields in the second object tag 808 are exemplary as other information and applications can be used. Further, the triggers for presenting augmented reality information could be based on the screen position and/or geo-referenced coordinates of the user's gaze (e.g., x,y,z coordinates). The content of a text field in the second object tag 808 may also trigger the presentation of additional augmented reality information. For example, the device 402 can be configured to identify a word or symbol within the user's area of interest 806 and may use that information as a search input to an augmented reality content database.

Figure 9:
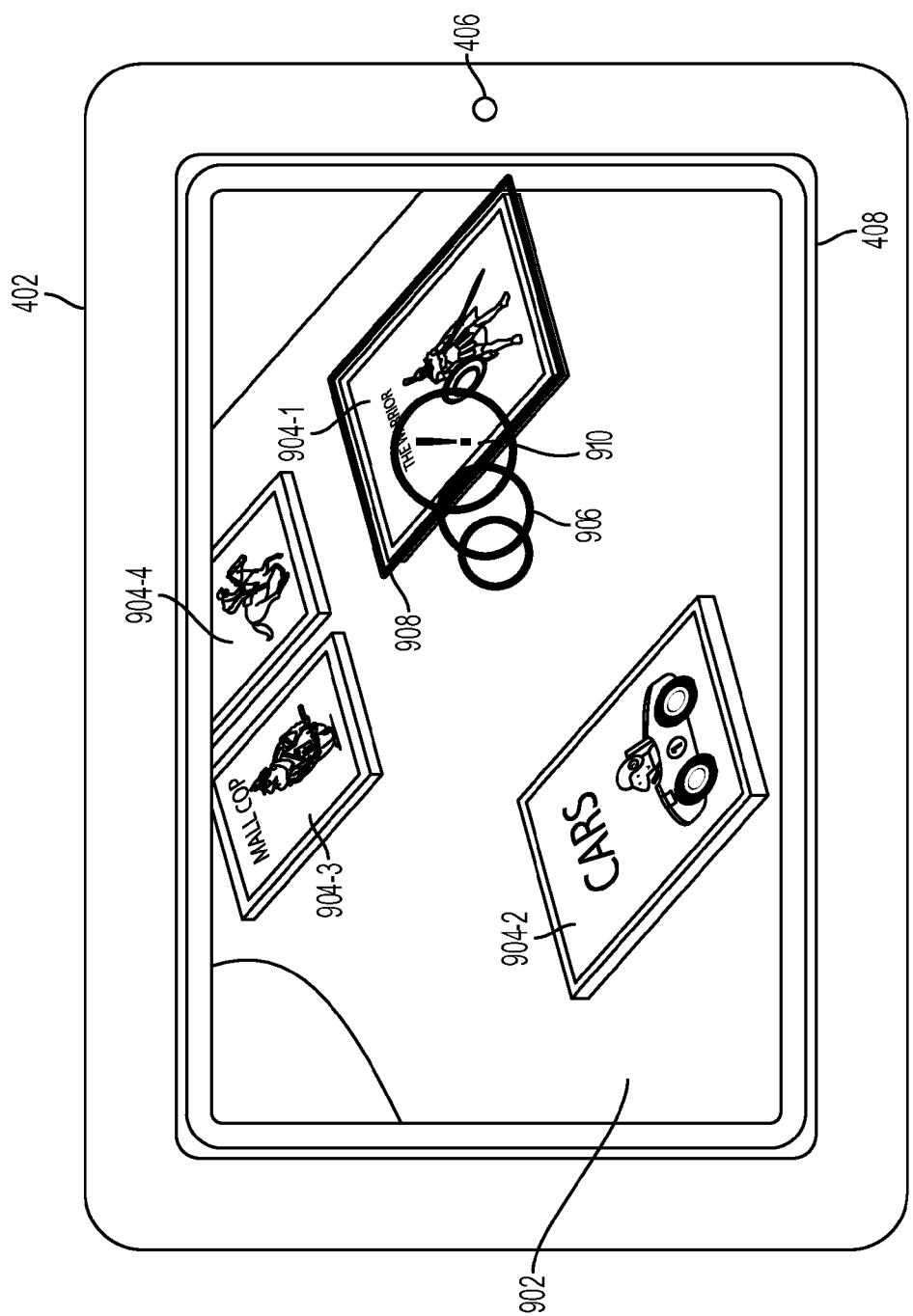
FIG. 9 is an exemplary illustration of a device configured to perform image segmentation and object recognition based on eye gaze tracking.

Referring to FIG. 9, with further reference to FIG. 4, an exemplary illustration of performing image segmentation and object recognition based on eye gaze tracking is shown. The device 402 includes a front-facing camera (not shown), a back-facing camera 406, and a display 408. The image in the display 408 shows an image 902 including several real world objects spread across the image. In this example, the real world objects include a first DVD case 904-1, a second DVD case 904-2, a third DVD case 904-3, and a fourth DVD case 904-1. The image 902 also includes an area of interest 906, an image segment 908, and an exemplary exclamation point object tag 910. In operation, the device 402 can be positioned such that the front-facing camera (not shown) captures the image 902 of the real world objects. The device 402 can be in camera view mode, AR mode, or the image can based on a file previously stored in memory. As the user gazes at the image 902, the back-facing camera 406 can be used with the eye gaze tracking process 300 to determine an area of interest 906. The location of the area of interest 906 can be used to initiate a two-step augmented reality process. In the first step, the location of the area of interest 906 is used to determine a segment 908. In the second step, an image recognition process is performed on the segment 908 and the associated augmented reality information may be presented. For example, when the area of interest 906 lingers over the first DVD case 904-1, the device 402 can initiate image segmentation algorithms to determine the image segment 908. In an embodiment, the results of the segmentation process can be displayed as a highlighted border around the segment (e.g., an image segment boundary line as depicted in FIG. 9). The device 402 may then execute one or more object detection pipeline algorithms for the segment. In an embodiment, the device 402 can send the segment image information to a remote server and the remote server can execute the object detection algorithms for the segment. In either embodiment, the results of the object detection algorithms may indicate that object tags and additional augmented reality information can be presented on the display 408. For example, the results of the object detection may indicate that augmented reality information that is associated with the first DVD case 904-1 exists and is available for display. In an embodiment, the augmented reality information can be displayed when the area of interest 906 lingers on the segment 908. In an embodiment, an object tag (e.g., the exclamation object tag 910) can be displayed first to alert the user that augmented reality information is available. The augmented reality information can then be displayed if the area of interest 906 lingers on the displayed object tag (e.g., exclamation object tag 910).

The segment 908 may also be provided as an input to an augmented reality tracking algorithm such that the displayed augmentation information follows (e.g., tracks) the target object. The processor(s) 104 may be configured to execute a pose-estimation and/or tracking algorithm on the segment 908. In operation, the tracking algorithm may allow the rendered augmented reality information to be displayed in a view that corresponds with the position and orientation of the front facing camera 204. For example, when the device 202 is in a first orientation, an augmented reality object can be displayed in a first AR pose. When the device 202 is in a second orientation, the augmented object can be displayed in a second AR pose. Providing the segment 908 to the object detection and/or tracking algorithm may reduce the amount of computational complexity involved to detect and/or track the object and therefore may reduce the power drain for augmented reality applications. In an embodiment, the object detection algorithm may be performed on a remote server For example, a mobile device may determine an image segment and send the image segment data to the remote server. The remote server can be configured to perform an object recognition process, and optionally an object tracking process, on the image segment. The remote server may return the results of the object recognition process, and optionally pose information, to the mobile device. The process of identifying a segment 908 and sending the segment 908 to the remote server may reduce the amount of data that is transmitted to the remote server (e.g., network, cloud).

As an example, and not a limitation, the area of interest 906 may define a seed point for the image segmentation algorithm, or it may define the center of the object, or it may establish the foreground of the image (see Mishra, Aloimonos, Fah "Active Segmentation with Fixation," International Conference on Computer Vision (ICCV), 2009, incorporated herein by reference). Other segmentation algorithms may be used. The active segmentation algorithm may be used to determine the boundary edge fragments of an image. The coarseness of the segmentation may be a function of the segmentation algorithm, and/or the available processing capabilities of the mobile device 100. A segment within an image is smaller than the entire image. The reduction in size may correspond to reduced memory and processing requirements which may enable or improve object recognition processing on a mobile device 100. In a remote processing application, the segment can be provided to the remote server for image recognition processing. Providing only a segment to a remote server may provide additional security benefits in that an entire image, which may include confidential information, is not provided.

In an embodiment, the object detection algorithms can down sample the image segment 908 and perform feature detection within the segment. In operation, as the user's gaze lingers over the segment 908 (i.e., the DVD case 904-1), augmented reality information can be displayed based on the subsequent image recognition process. The augmented reality information can be an object tag, or other information such as a movie trailer associated with the DVD case 904-1, a link to an on-line retailer, or other type of thematic animation. Other forms of augmented reality information may also be presented.

Figure 10:
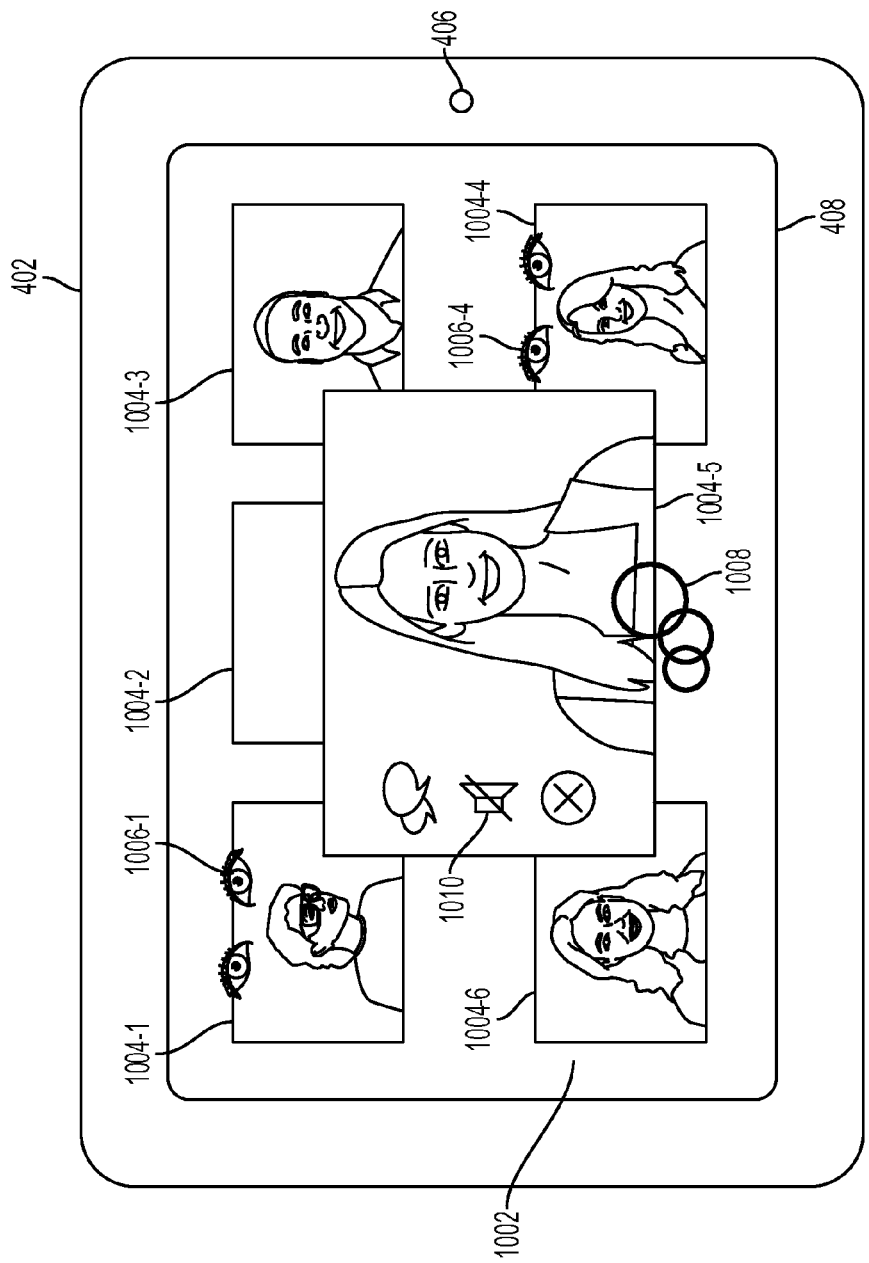
FIG. 10 is an illustration of a group video conference with eye gaze tracking implementations.

Referring to FIG. 10, an illustration of a group video conference with eye gaze tracking implementations is shown. The device 402 includes a network connection (not shown), a back-facing camera 406, and a display 408. The image in the display 408 shows an image 1002 including video representations of multiple video conference participants (e.g., 1004-1, 1004-2, 1004-3, 1004-4, 1004-5, 1004-6), one or more remote user gaze location feedback icons 1006-1, 1006-4, an area of interest 1008, and video conference control icons 1010. In operation, the device 402 may be used with a group video conferencing application configured to display near-real time images of the video conference attendees. For example, the conferencing application may present a conference image 1002 which may include face views of the participants 1004 (i.e., 1004-1 through 1004-6). The back-facing camera 406 can be used to capture the user's face for presentation to the other participants. The camera 406 may also be used with an eye gaze tracking algorithm to determine an area of interest 1008. As a user's gaze lingers over one of the images of one of the participants (e.g., 1004-5), the image of that participant can be expanded and centered in the display 408. For example, as the area of interest 1008 (i.e., the user's gaze) lingers over the lower center image 1004-5, the image 1004-5 is expanded and moved up into the center of the display 408. When the area of interest 1008 drifts away, the image 1004-5 can return to its original lower center location.

Additional functionality may be accessed based on the location of the area of interest 1008. For example, features such as mute, talk, chat, volume, disconnect, etc. . . . may be appear as video conference control icons 1010 on the selected image. The user can access these control features via by focusing their gaze (i.e., area of interest 1008) on an icon. Other functionality may include providing icons and/or links to social media sites for the participant, or displaying contact information for the participant. The size and spacing of the icons can be dependent on the sensitivity of the eye gaze algorithm, the distance between the camera 406 and the user, and the resolution of the display 408.

In an embodiment, the user's area of interest 1008 information can be included in the video conference data stream and provided to the other participants. The area of interest information may be used to provide an indication of interest to one or more of the participants. A remote user gaze location feedback icon 1006-1, 1006-2 may be used to indicate that a remote user is currently looking at an image of local user. For example, if a remote video conference call participant is currently looking at the image of the local user on their screen, then a remote user gaze feedback icon 1006-1 (e.g., a pair of eyes or other icon), can be presented to the local user on the display 408. Using the example depicted in FIG. 10, the remote participants associated with the images in the top left 1004-1 and the lower right 1004-4, are currently looking at the local user's image on their respective screens. The local user can become aware of the remote participants area of interest information via the one or more remote user gaze location feedback icons 1006-1, 1006-4 that are displayed on the respective images for the remote participants 1004-1, 1004-4.

Figure 11:
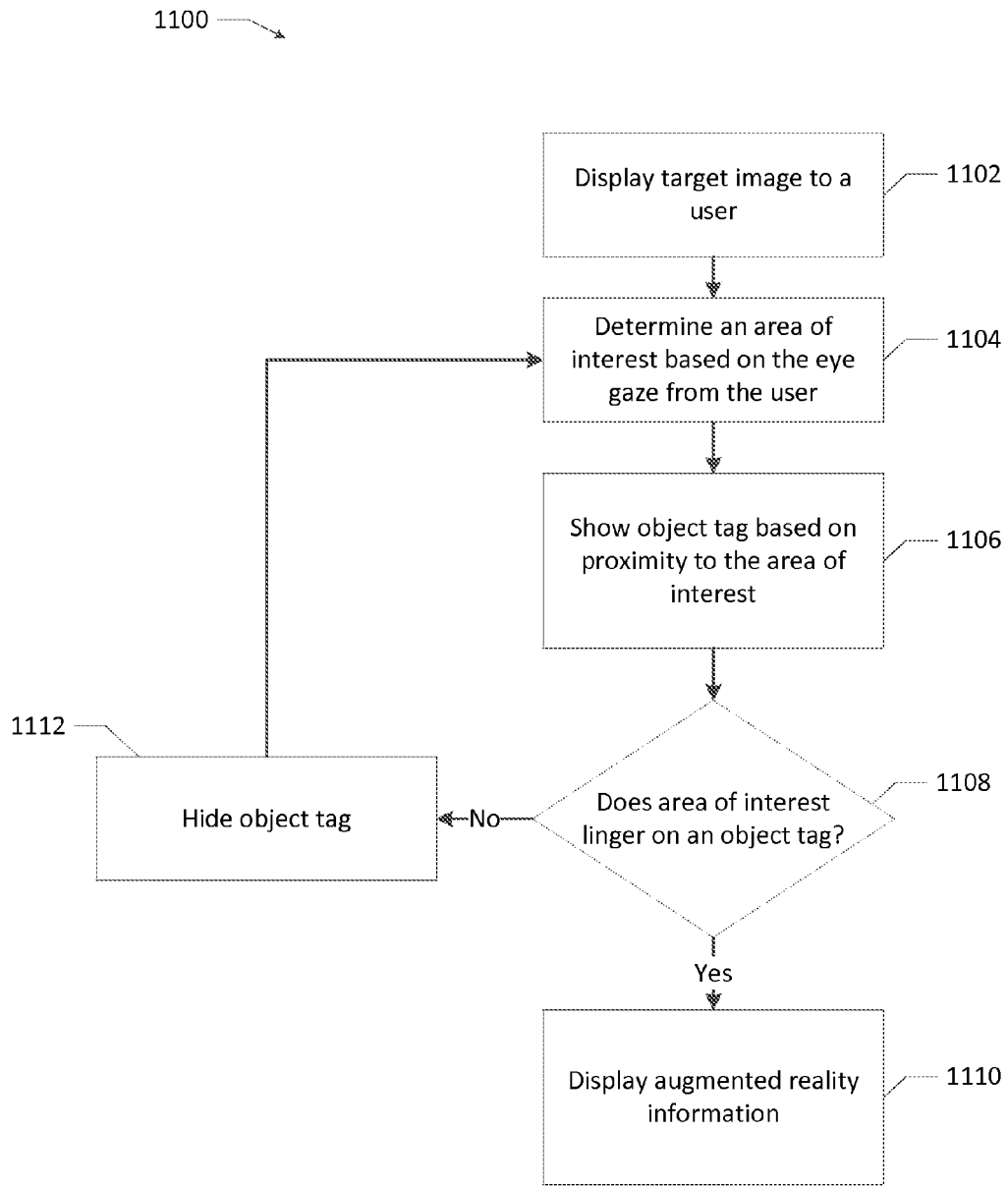
FIG. 11 is a process flow diagram, illustrating an exemplary process for showing augmentation objects based on an eye gaze location.

In operation, referring to FIG. 11, with further reference to FIGS. 2, 6A and 6B, a process 1100 for showing augmentation objects based on an eye gaze location using the device 200 includes the stages shown. The process 1100, however, is exemplary only and not limiting. The process 1100 may be altered, e.g., by having stages added, removed, or rearranged. The term "augmented reality information" generally refers to additional information that is presented to a user in response to the user's actions. For example, a user can direct the front facing camera 204 towards a target object, and the device 200 can present an object tag to indicate that the augmented reality information is associated with the target object. In an embodiment, various forms of objects tags can be used, such as presenting object tags 504, displaying text tags 704, displaying object tag icons 804, and displaying second object tags 808. Other graphical elements may be used as object tags. Augmented reality information may be presented when the user's gaze lingers on a target object and/or an object tag. As an example, and not a limitation, augmentation reality information can be other information that is associated with the target such as an image, an animation, a URL address, an interactive game or other applications.

At stage 1102, a user may direct the device 200 towards one or more target objects, and the target image 502 may be displayed to the user on the graphical display 208. The target image 502 can be obtained through a front-facing camera 204 (i.e., in camera view or AR view modes), or can be a file stored in memory 114 (e.g., a web download). The image can have an associated object tags and augmented reality information stored on a network server, or stored locally on the memory 114.

At stage 1104, the device 200 can determine an area of interest based on the user's eye gaze. In an embodiment, the memory 114 may include computer-readable instructions configured to cause the processor(s) 104 to execute an eye gaze processing algorithm to determine an area of interest on the target image 502. As an example, and not a limitation, the eye gaze algorithm can be as depicted in FIG. 3. Other eye gaze algorithms and apparatus may be used. In an embodiment, the area of interest can be determined via eye tracking tools (e.g., LC Technologies EyeFollower, Eye Tracker), eye tracking glasses (e.g., Tobii® Technology), or head mounted displays (e.g., Google Glasses). The area of interest 506 can be presented on the display 208 to provide feedback to the user. The shape and size of area of interest 506 can vary based on the speed and direction of the user's gaze. The processor(s) 104 may be configured to display the area of interest 506 with optional features such as a tracking (e.g., showing previous areas of interest as the user's eye pans across the image), and linger time (e.g., the longer the linger time, the larger the circle).

At stage 1106, the device 402 can display object tags based on the proximity to the area of interest 506. The target image 502 may include one or more features or segments which are associated with augmented reality information. For example, the associations with augmented reality information may be based on image recognition processes, location services, or contained within metadata for a static image. The locations of the features or segments may be referenced to Cartesian coordinates on the display (e.g., pixel location). The memory 114 may include instructions configured to cause the processor(s) 104 to determine the distance between area of interest and the location of a particular feature or segment. In an example, the object tag 504-1 can be shown (i.e., a visible property can be set to true) as the area of interest 506 passes over, or close to, a particular feature of segment. Similarly, as the area of interest 506 moves away from that particular feature of segment, the object tag 504-1 can be hidden (i.e., a visible property can be set to false). The transition between the show and hide state of the object tag can be a fade, dissolve, swipe, or other graphical transition.

At stage 1108, the processor(s) 104 can be configured to determine whether the area of interest 506 is lingering on or about the feature or the displayed object tag 504-1. The sensitivity of the eye gaze technology may influence the amount of time required to determine that the area of interest is lingering. Examples of linger durations can include 0.25, 0.5, 0.75, 1.0, 1.5 seconds. Other linger times may also be used based on the nature of augmented reality information. Referring to FIG. 6A, the location of the area of interest 506 may remain on or about the image feature. In an example, referring to FIG. 6B, the location of the area of interest may remain on or about the area in the display that contains the object tag 504-1.

At stage 1110, the processor(s) 104 may be configured to present augmented reality information on the display 208. In an example, the augmented reality information may be an additional text or graphical information that is displayed to the user. The object tag presented at stage 1106 can transition to the augmented reality information when an established linger duration threshold is satisfied. The augmented reality information may include instructions configured to cause the processor 104 to execute a software application (e.g., web browser, map application, media player, etc. . . . ) that may be associated with the target object. Other augmented reality information may also be displayed.

At stage 1112, if the area of interest does not linger on (i.e., moves away from) an area of the image which contains a feature or the object tag 504-1, then the associated object tag 504-1 can transition from a show to a hide state. The process can continue at stage 1104.

Figure 12:
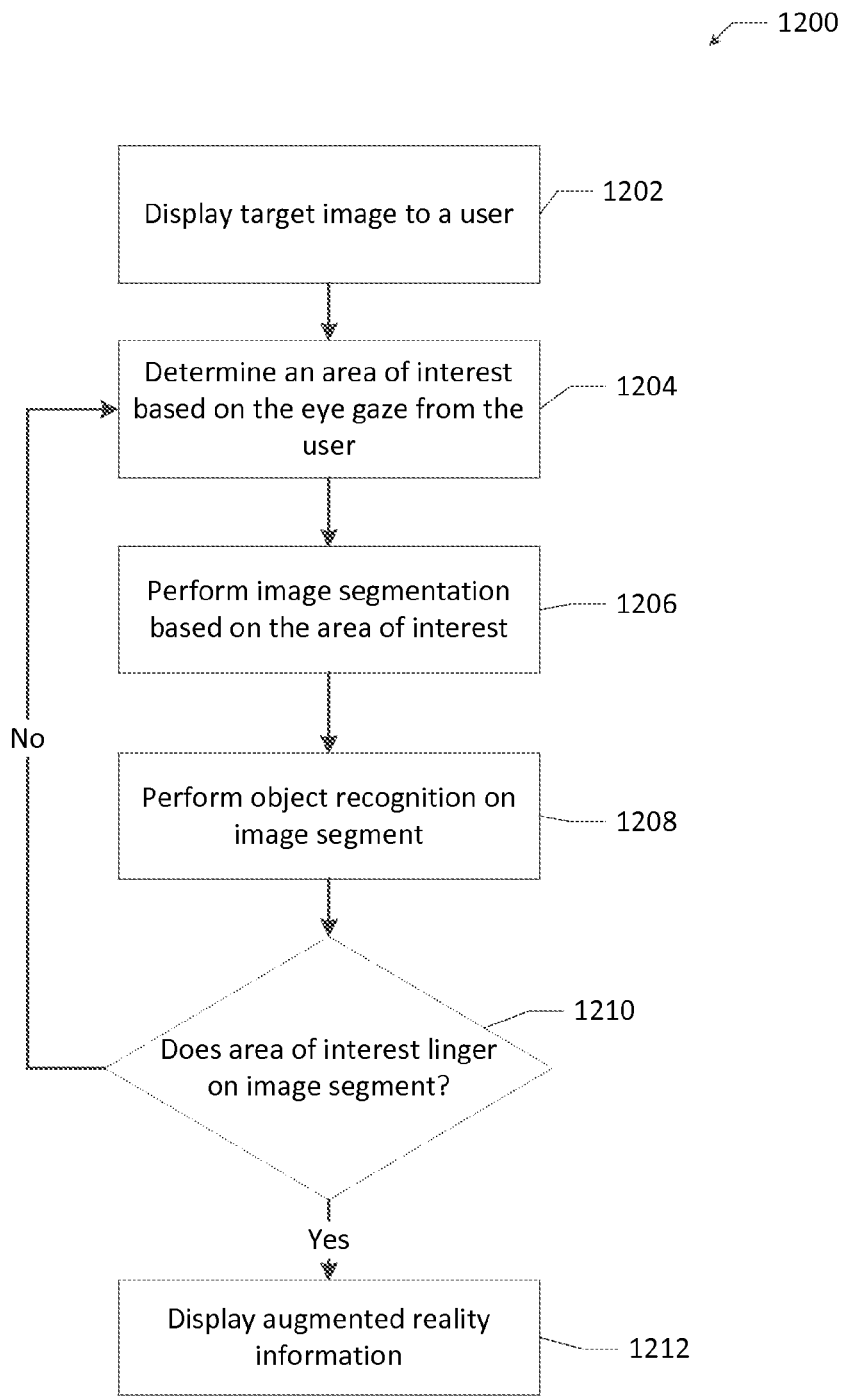
FIG. 12 is a process flow diagram, illustrating an exemplary process for performing object recognition in the neighborhood of an eye gaze location.

In operation, referring to FIG. 12, with further reference to FIG. 9 as an example, a process 1200 for performing object recognition in the neighborhood of an eye gaze location using the device 402 includes the stages shown. The process 1200, however, is exemplary only and not limiting. The process 1200 may be altered, e.g., by having stages added, removed, or rearranged.

At stage 1202, a user directs the front-facing camera on the device 402 towards one or more target objects. The processor(s) 104 are configured to display a target image 902 to the user on the display. In a typical AR application, the target image 902 is acquired via the front-facing camera. For example, the user can point the device 402 toward a sign, billboard, consumer product, or other real world object and the image is displayed in a camera view or AR view mode.

At stage 1204, the processor(s) 104 may be configured to determine an area of interest 906 based on the eye gaze from the user. As described, an eye gaze tracking algorithm stored in memory 114 may utilize the back-facing to determine the area of interest 906. Other eye gaze tracking hardware and software may also be used.

At stage 1206, the processor(s) 104 may be configured to perform an image segmentation algorithm based on the location of the area of interest 906. In an embodiment, if the area of interest lingers over a predetermined area (e.g., 10, 30, 100, 200 sq pixels) of the image 902 for a predetermined time (e.g., 0.5, 1, 2, 4 seconds), the image segmentation algorithm may be executed. The area of interest 906 may be used to define a seed point for the image segmentation process. The area of interest may be used to define the center of an object, or establish a foreground of the image. The location of the area of interest 906 may be used as an input to other segmentation algorithms to identify a segment of interest. In an embodiment, an image segmentation algorithm determines the segments in an image, and the location of the area of interest 906 may be used to select one or more of the segments for processing by an object recognition algorithm.

At stage 1208, the processors(s) 104, or a remote server, may be configured to perform object recognition on the image segment. In an embodiment, the object detection algorithms can down sample the image segment 908 and perform feature detection within the segment. In an embodiment, the feature detection techniques are generally described with respect to scale invariant feature transform (SIFT) algorithms to perform localization of keypoints and the extraction of features descriptors within a segment. For object recognition, a database of feature descriptor sets and other discriminating information may be derived from training images. Feature descriptors are then extracted from an image segment and used to query the database, to assess the contents of a given query image. For augmented reality or visual search applications, the device 402 may capture an image, perform a segmentation algorithm, and compare the features in the segment against the database of images, features, and meta-data information. This database can be stored on a server on the network, and can either be retrieved by the device 402 for local processing or alternatively, the query can be transmitted to the remote server to be processed using network resources.

At stage 1210, the processor(s) 104 may be configured to determine if the area of interest 906 is lingering on the area of the image 902 defined by the image segment 908. If the area of interest 906 linger time on a segment 908 exceeds an established threshold (e.g., 1.0, 1.5, 2.0, 3.0 seconds), then the device 402 can display augmented reality information associated with the object at stage 1212. For example, the augmented reality information associated with the first DVD case 904-1 can be a movie trailer, an on-line store, an interactive game, or other application. If the area of interest 906 does not linger on the segment 908, then the process can repeat at stage 1204. In some embodiments, performance of stage 1210 is optional.

Figure 13:
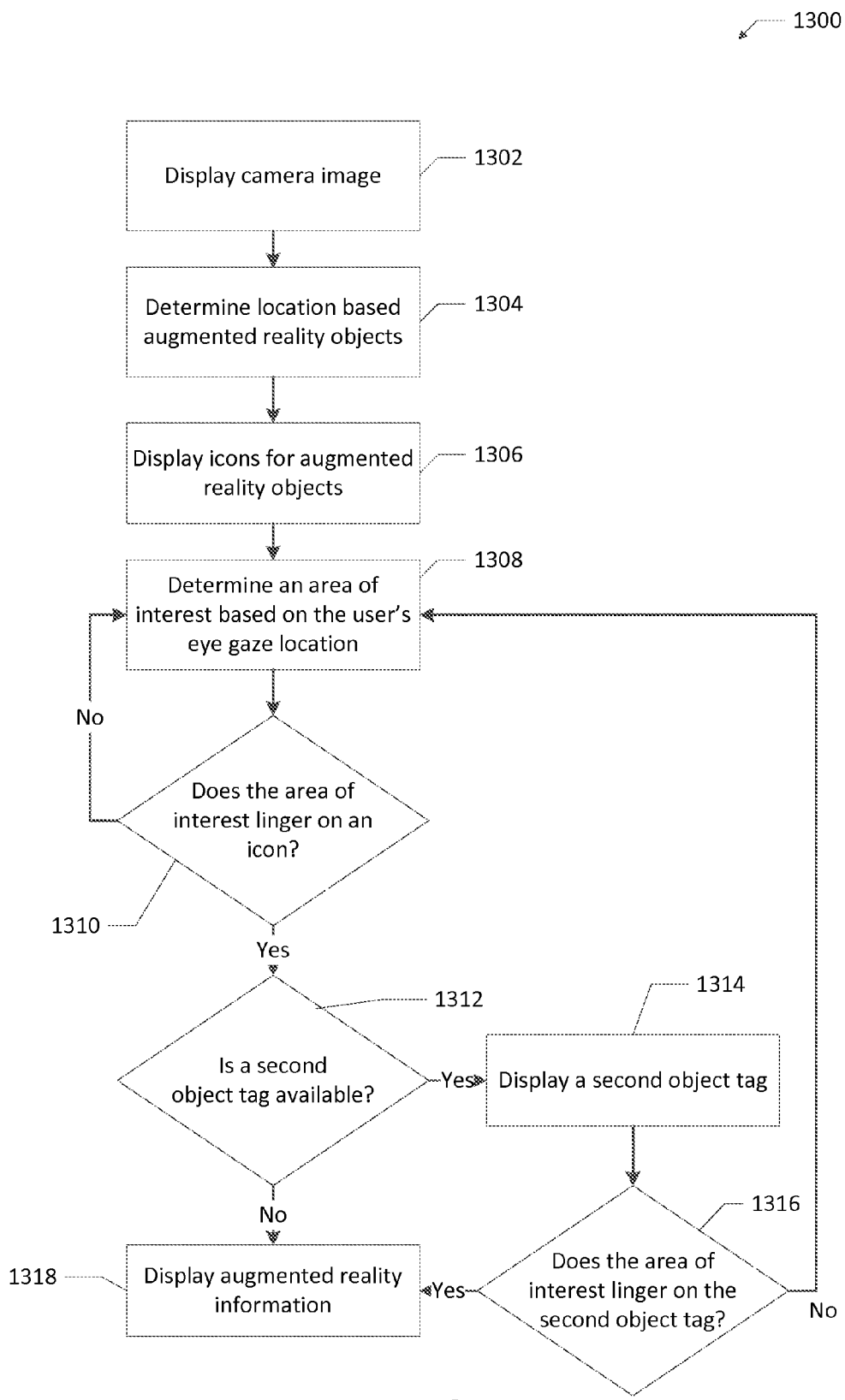
FIG. 13 is a process flow diagram, illustrating an exemplary process for displaying icons for location based augmented reality objects.

In operation, referring to FIG. 13, with further reference to FIGS. 7 and 8, an exemplary process 1300 for displaying icons for location based augmented reality objects using the device 402 includes the stages shown. The process 1300, however, is exemplary only and not limiting. The process 1300 may be altered, e.g., by having stages added, removed, or rearranged.

At stage 1302 the device 402 may obtain an image with the front-facing camera. In an embodiment, image 702 may be a street view that is presented on the display 408 in a camera view or AR view mode. As depicted in FIG. 8, the target image may be a file displayed in a browser or other application (e.g., Google Streetview, Yelp Monocle). The device 402 may exchange location information with a location based services system. For example, the location information can be based on a GPS position, WiFi based position, or other positioning techniques as known in the art. The location information may also include an approximate heading as derived from onboard GPS chips and other internal sensors. A location based services system can provide augmented reality information to the device 402 based on the location information. For example, referring to FIG. 7, the location based services system can provide object tags 704 which are associated with locations depicted in the image 702.

In an embodiment, at stage 1304 the device 402 may receive augmented reality objects including object tags, object icons, second object tags, and other augmented reality information from a location based services system or other networked resource. The augmented reality objects may also be previously stored in memory 114. The augmented reality information may be geo-referenced (e.g., indexed based on the geographical location) to the objects in the image 802. At stage 1306, the device 402 can be configured to utilize the location information to display one or more an icons 804 in the appropriate location on the image 702.

At stage 1308, the device 402 may determine an area of interest 806 based on the user's eye gaze location. For example, the device may utilize the back-facing camera 406 and an eye gaze algorithm stored in memory 114. In an embodiment, the area of interest can be determined from other eye tracking technology such as Tobii® Technology glasses, or a head mounted gaze tracking technology. A representation of the area of interest 806 may be displayed to provide the user feedback regarding the current position of the area of interest. For example, as depicted in FIG. 8, the area of interest 806 may be one or more expandable circles as previously described. Other examples of graphical representations of an area of interest include, but are not limited to, a magnifying glass icon, a shadow effect, a sunken effect, a raised effect, a bubble effect, an arrow icon, or an eye ball icon.

At stage 1310, the processor(s) 104 may be configured to determine the amount of time the area of interest 806 lingers on or near an icon 804. The amount of linger time and the positional tolerance may vary based on the sensitivity of the eye tracking technology, and/or the density of the available augmented reality information in an image. For example, the linger time can be approximately 1, 2, or 3 seconds, and the positional tolerance can be approximately 5, 10, or 20 pixels. Other values can be used. If the area of interest 806 does not linger on an icon 804, then the processor(s) 104 may be configured to continue to determine an area of interest as described at stage 1308.

At stage 1312, the processor(s) 104 may be configured to determine if the augmented reality information associated with a location includes a second object tag 808. The second object tag 808 may include text, another icon, or other GUI programming object (e.g., list box, combo box, radio button, command button, etc. . . . ). If a second object tag is available, it can be displayed at stage 1314. In an embodiment, the second object tag 808 can be geo-referenced to the image 802 and thus will move as the image 802 moves across the display 408 (i.e., as the orientation of the front-facing camera changes). The second object tag 808 may be referenced to a position on the display 408, and thus remain in the same, or close to the same (i.e., dampened), relative position on the display 408 for a short period (e.g., 1, 2, 5 seconds) regardless of the movement of the image 802 (if any).

At stage 1316, the device 402 may be configured to determine if the area of interest is lingering on the second object tag 808. The duration of the linger time for the second object tag may be, but need not be, less than the linger time used on an object icon 804 as described at stage 1310. In an embodiment, the second object tag 808 may be a list box including multiple selection options. The size of the second object tag 808 may expand over the display 408 to increase the target size of the second object tag 808. The increased target size may improve the efficiency of the eye gaze tracking algorithm, and may improve the eye gaze tracking selection results.

At stage 1318, the device 402 may be configured to display the augmented reality information. Examples of the augmented reality information may include, but are not limited to, GUI objects, media files, hypertext, or executing one or more applications (e.g., web browser, games, mapping software, social network applications).

Unless specifically stated otherwise, as apparent from the following discussion, it is appreciated that throughout this specification discussions utilizing terms such as "processing," "computing," "calculating,", "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in some implementations" or other like phrases in various places throughout this specification are not necessarily all referring to the same feature, example, and/or limitation. Furthermore, the particular features, structures, or characteristics may be combined in one or more examples and/or features.

The methodologies and mobile device described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

In addition to storage on computer readable medium, instructions and/or data may be provided as signals on transmission media included in a communication apparatus. For example, a communication apparatus may include a transceiver having signals indicative of instructions and data. The instructions and data are configured to cause at least one processor to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

The invention claimed is:

1. A method for enabling object recognition using eye gaze tracking, comprising:
    displaying, on a display screen, an image of a scene viewable by a user;
    receiving information indicative of an eye gaze of the user;
    determining an area of interest within the image based on the eye gaze information;
    displaying, on the display screen, a tracking region representing the area of interest;
    determining an image segment based on the area of interest, the image segment being associated with an initial position of an object in the scene, wherein the image segment is determined when the tracking region is within a threshold proximity of the object;
    initiating an object recognition process on the image segment, wherein the object recognition process is limited to an area defined by the image segment;
    displaying an object tag on the display screen if a result of the object recognition process indicates that augmented reality information is available, wherein the object tag remains at a fixed position relative to the initial position of the object associated with the object tag and relative to the display screen for a plurality of images of the scene, and wherein the object tag automatically remains at the fixed position in the plurality of images as the object associated with the object tag is displayed at different positions in the plurality of images;
    displaying augmented reality information on the display screen if the gaze of the user is directed on or about the object tag at the fixed position; and
    hiding the object tag if the gaze of the user is not directed on or about the object tag.

2. The method of claim 1, wherein the initiating comprises performing the object recognition process.

3. The method of claim 1, wherein the initiating comprises providing the image segment to a remote server and receiving the object recognition result from the remote server.

4. The method of claim 3, comprising:
    receiving pose information from the remote server; and
    displaying the augmented reality information based on the pose information.

5. The method of claim 1, wherein the image is captured with a first camera coupled to a mobile device, and wherein the eye gaze information is determined based on an image captured with a second camera coupled to the mobile device.

6. The method of claim 1 wherein the object tag is displayed on the display screen for a preset time period.

7. The method of claim 1, wherein object tags associated with different objects are displayed at different fixed positions in the plurality of images as the objects associated with the object tags are displayed at different positions in the plurality of images.

8. The method of claim 1, wherein the initial position of the object is based on a position of the object when the object tag is displayed.

9. The method of claim 1, wherein the position of the object tag remains in the fixed position relative to the initial position of the object and relative to the display screen for a pre-determined period of time.

10. The method of claim 1, wherein the position of the object tag remains in the fixed position relative to the initial position of the object and relative to the display screen as long as the gaze of the user is directed on or about the object tag.

11. The method of claim 1, wherein the augmented reality information is displayed on the display screen if the gaze of the user is directed on or about the object tag at the fixed position for a threshold amount of time.

12. An apparatus for enabling object recognition using eye gaze tracking, comprising:
    a memory;
    at least one processor coupled to the memory and configured to:
        cause an image of a scene viewable by a user to be displayed on a display screen to the user;
        receive information indicative of an eye gaze of the user;
        determine an area of interest within the image based on the eye gaze information;
        cause a tracking region representing the area of interest to be displayed on the display screen;
        determine an image segment based on the area of interest, the image segment being associated with an initial position of an object in the scene, wherein the image segment is determined when the tracking region is within a threshold proximity of the object;
        initiate an object recognition process on the image segment, wherein the object recognition process is limited to an area defined by the image segment; and
        cause an object tag to be displayed on the display screen if a result of the object recognition process indicates that augmented reality information is available, wherein the object tag remains at a fixed position relative to the initial position of the object associated with the object tag and relative to the display screen for a plurality of images of the scene, and wherein the object tag automatically remains at the fixed position in the plurality of images as the object associated with the object tag is displayed at different positions in the plurality of images;

cause augmented reality information to be displayed on the display screen if the gaze of the user is directed on or about the object tag at the fixed position; and cause the object tag to be hidden if the gaze of the user is not directed on or about the object tag.

13. The apparatus of claim 12, wherein the at least one processor is configured to perform the object recognition process.

14. The apparatus of claim 12, wherein the at least one processor is configured to provide the image segment to a remote server and receive the object recognition result from the remote server.

15. The apparatus of claim 14, wherein the at least one processor is configured to:

receive pose information from the remote server; and cause the augmented reality information to be displayed based on the pose information.

16. The apparatus of claim 12, wherein the at least one processor is configured to capture the image with a first camera coupled to a mobile device, and determine the eye gaze information based on an image captured with a second camera coupled to the mobile device.

17. An apparatus for enabling object recognition using eye gaze tracking, comprising:

means for displaying, on a display screen, an image of a scene viewable by a user;

means for receiving information indicative of an eye gaze of the user;

means for determining an area of interest within the image based on the eye gaze information;

means for displaying, on the display screen, a tracking region representing the area of interest;

means for determining an image segment based on the area of interest, the image segment being associated with an initial position of an object in the scene, wherein the image segment is determined when the tracking region is within a threshold proximity of the object;

means for initiating an object recognition process on the image segment, wherein the object recognition process is limited to an area defined by the image segment;

means for displaying an object tag on the display screen if a result of the object recognition process indicates that augmented reality information is available, wherein the object tag remains at a fixed position relative to the initial position of the object associated with the object tag and relative to the display screen for a plurality of images of the scene, and wherein the object tag automatically remains at the fixed position in the plurality of images as the object associated with the object tag is displayed at different positions in the plurality of images;

means for displaying augmented reality information on the display screen if the gaze of the user is directed on or about the object tag at the fixed position; and means for hiding the object tag if the gaze of the user is not directed on or about the object tag.

18. The apparatus of claim 17, wherein the means for initiating comprises means for performing the object recognition process.

19. The apparatus of claim 17, wherein the means for initiating comprises means for providing the image segment to a remote server and means for receiving the object recognition result from the remote server.

20. The apparatus of claim 19, comprising:

means for receiving pose information from the remote server; and means for displaying the augmented reality information based on the pose information.

21. The apparatus of claim 17, wherein the image is captured with a first camera coupled to a mobile device, and wherein the eye gaze information is determined based on an image captured with a second camera coupled to the mobile device.

22. A non-transitory computer storage medium comprising processor-executable instructions configured to cause a processor to:

display, on a display screen, an image to a user of a scene viewable by the user;

receive information indicative of an eye gaze of the user;

determine an area of interest within the image based on the eye gaze information;

display, on the display screen, a tracking region representing the area of interest;

determine an image segment based on the area of interest, the image segment being associated with an initial position of an object in the scene, wherein the image segment is determined when the tracking region is within a threshold proximity of the object;

initiate an object recognition process on the image segment, wherein the object recognition process is limited to an area defined by the image segment;

display an object tag on the display screen if a result of the object recognition process indicates that augmented reality information is available, wherein the object tag remains at a fixed position relative to the initial position of the object associated with the object tag and relative to the display screen for a plurality of images of the scene, and wherein the object tag automatically remains at the fixed position in the plurality of images as the object associated with the object tag is displayed at different positions in the plurality of images;

display augmented reality information on the display screen if the gaze of the user is directed on or about the object tag at the fixed position; and hide the object tag if the gaze of the user is not directed on or about the object tag.

* * * * *